(12) United States Patent
Lee et al.

(10) Patent No.: US 12,470,847 B2
(45) Date of Patent: Nov. 11, 2025

(54) IMAGE SENSOR DEVICE AND METHODS OF FORMATION

(71) Applicant: Taiwan Semiconductor Manufacturing Company, Ltd., Hsinchu (TW)

(72) Inventors: Kuo-Cheng Lee, Tainan (TW); Ping-Hao Lin, Tainan (TW); Yun-Wei Cheng, Taipei (TW); Bo-Ge Huang, Tainan (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 308 days.

(21) Appl. No.: 18/189,662

(22) Filed: Mar. 24, 2023

(65) Prior Publication Data

US 2024/0323555 A1    Sep. 26, 2024

(51) Int. Cl.
*H04N 25/63*     (2023.01)
*H04N 25/131*    (2023.01)
*H04N 25/75*     (2023.01)
*H10F 39/00*     (2025.01)

(52) U.S. Cl.
CPC ............. *H04N 25/63* (2023.01); *H04N 25/75* (2023.01); *H10F 39/8057* (2025.01); *H04N 25/131* (2023.01)

(58) Field of Classification Search
None
See application file for complete search history.

(56) References Cited

U.S. PATENT DOCUMENTS

2021/0225916 A1*  7/2021  Hsieh .................. H10F 39/011
2022/0367549 A1   11/2022  Hsieh et al.

\* cited by examiner

*Primary Examiner* — Mark T Monk
(74) *Attorney, Agent, or Firm* — Harrity & Harrity, LLP

(57) ABSTRACT

An image sensor device may include a pixel sensor array and a black level correction (BLC) region. The BLC region may include a sensing region in a substrate and a light-blocking layer above the sensing region. An anti-reflection array may be formed in the light-blocking layer. The anti-reflection array includes holes, trenches, and/or other structural features such that the light-blocking layer includes two or more areas in which the top surface of the light-blocking layer is at different heights in the image sensor device. The different heights of the top surface of the light-blocking layer reduce the likelihood of light being reflected off of the light-blocking layer and toward the pixel sensor array. The anti-reflection array may reduce the likelihood of occurrence of flares or hot spots in images generated by the image sensor device, which may increase the image quality of the images generated by the image sensor device.

20 Claims, 31 Drawing Sheets

IMAGE SENSOR DEVICE AND METHODS OF FORMATION

BACKGROUND

Complementary metal oxide semiconductor (CMOS) image sensor (CIS) devices utilize light-sensitive CMOS circuitry to convert light energy into electrical energy. The light-sensitive CMOS circuitry may include a photodiode formed in a silicon substrate. As the photodiode is exposed to light, an electrical charge is induced in the photodiode (referred to as a photocurrent). The photodiode may be coupled to a switching transistor, which is used to sample the charge of the photodiode. Colors may be determined by placing filters over the light-sensitive CMOS circuitry.

Light received by pixel sensors of a CIS device is often based on the three primary colors: red, green, and blue (R, G, B). Pixel sensors that sense light for each color can be defined through the use of a color filter that allows the light wavelength for a particular color to pass into a photodiode. Some pixel sensors may include a near infrared (NIR) pass filter, which blocks visible light and passes NIR light through to the photodiode.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
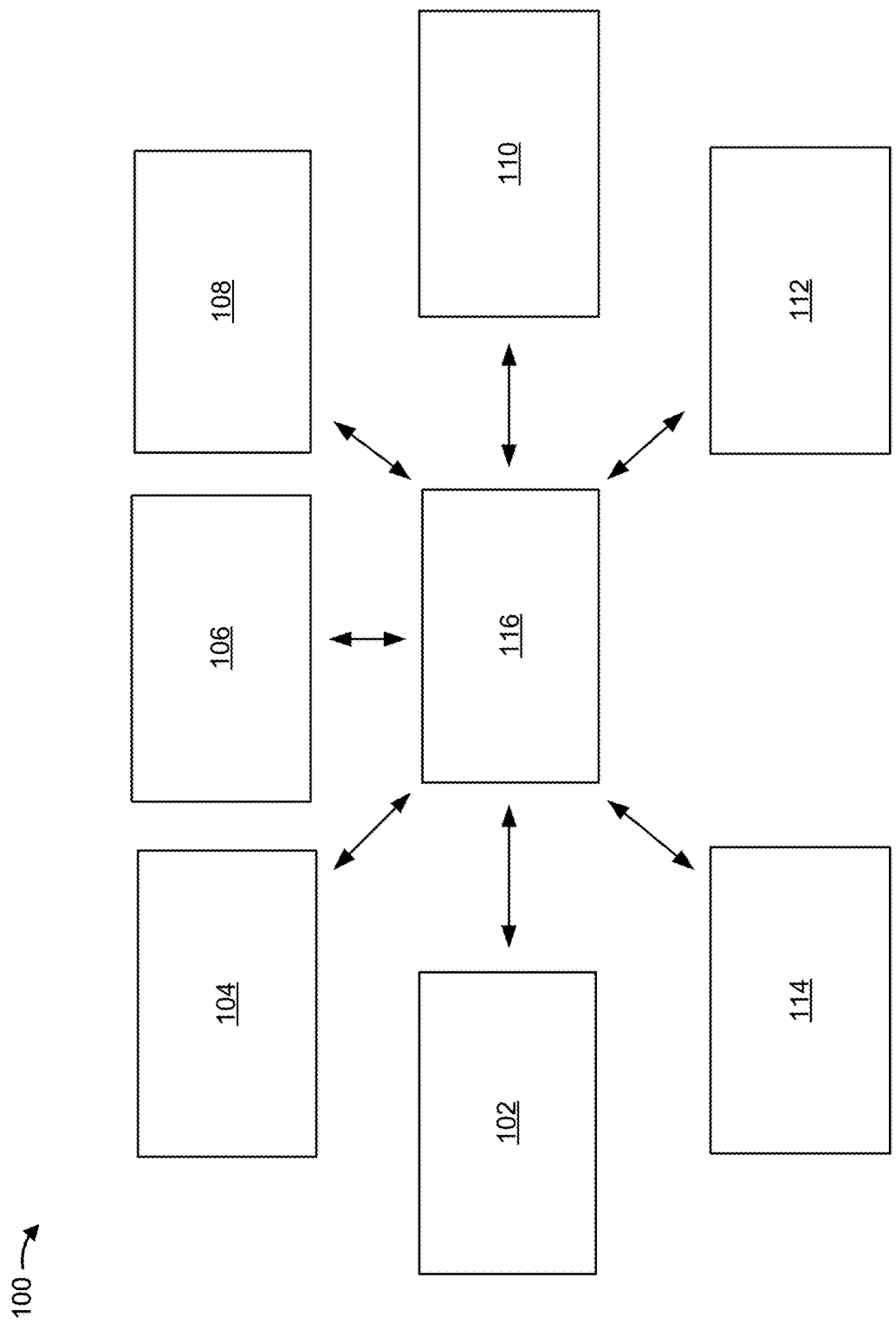
FIG. 1 is a diagram of an example environment in which systems and/or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some cases, an image sensor device (e.g., a complementary metal oxide semiconductor (CMOS) image sensor (CIS) device) may include a black level correction (BLC) region adjacent to and/or surrounding a pixel sensor array of the image sensor device. The BLC region includes one or more layers of light-blocking material that prevents light from entering a sensing region under the one or more layers. The sensing region is "dark" in that the one or more layers prevent incident light from entering the sensing region. This enables the sensing region to generate a dark current measurement for black level correction (or black level calibration) for the pixel sensor array. Dark current is an electrical current that occurs in the image sensor device as a result of an energy source other than incident light. Dark current may result from, for example, heat generated by the image sensor device and/or by one or more other devices near the image sensor device. Dark current can cause noise and other defects in images and/or video captured by the image sensor device. For example, dark current can artificially increase the photocurrent generated by pixel sensors in the pixel sensor array, which can result in elevated black levels and/or can cause some of the pixels in an image or a video to register as a white pixel or a hot pixel.

The light-blocking material(s) that are often used in the BLC region may be metallic and reflective. While high reflectivity may result in increased light-blocking performance, the reflectivity of the light-blocking material(s) may cause light to be reflected toward the pixel sensors in the pixel sensor array. The light reflected toward the pixel sensors in the pixel sensor array can cause flares or hot spots (e.g., areas of increased brightness) in images and/or videos generated by the image sensor device, and/or can otherwise reduce the image quality of the images and/or videos generated by the image sensor device.

In some implementations described herein, an image sensor device includes a pixel sensor array and a BLC region adjacent to the pixel sensor array. The BLC region may include a sensing region in a substrate and a light-blocking layer above the sensing region. An anti-reflection array may be formed in the light-blocking layer. The anti-reflection array includes holes, trenches, and/or other structural features such that the light-blocking layer includes two or more areas in which the top surface of the light-blocking layer is at different heights in the image sensor device. The different heights of the top surface of the light-blocking layer reduce the likelihood of light being reflected off of the light-blocking layer and toward the pixel sensor array. In this way, the anti-reflection array may reduce the likelihood of occurrence of flares or hot spots in images and/or videos generated by the image sensor device, which may increase the image quality of the images and/or videos generated by the image sensor device.

FIG. 1 is a diagram of an example environment 100 in which systems and/or methods described herein may be implemented. As shown in FIG. 1, environment 100 may include a plurality of semiconductor processing tools 102-114 and a wafer/die transport tool 116. The plurality of semiconductor processing tools 102-114 may include a deposition tool 102, an exposure tool 104, a developer tool 106, an etch tool 108, a planarization tool 110, a plating tool 112, an ion implantation tool 114, and/or another type of semiconductor processing tool. The tools included in example environment 100 may be included in a semiconductor clean room, a semiconductor foundry, a semiconductor processing facility, and/or manufacturing facility, among other examples.

The deposition tool 102 is a semiconductor processing tool that includes a semiconductor processing chamber and one or more devices capable of depositing various types of materials onto a substrate. In some implementations, the deposition tool 102 includes a spin coating tool that is capable of depositing a photoresist layer on a substrate such as a wafer. In some implementations, the deposition tool 102 includes a chemical vapor deposition (CVD) tool such as a plasma-enhanced CVD (PECVD) tool, a low pressure CVD (LPCVD) tool, a high-density plasma CVD (HDP-CVD) tool, a sub-atmospheric CVD (SACVD) tool, an atomic layer deposition (ALD) tool, a plasma-enhanced atomic layer deposition (PEALD) tool, or another type of CVD tool. In some implementations, the deposition tool 102 includes a physical vapor deposition (PVD) tool, such as a sputtering tool or another type of PVD tool. In some implementations, the example environment 100 includes a plurality of types of deposition tools 102.

The exposure tool 104 is a semiconductor processing tool that is capable of exposing a photoresist layer to a radiation source, such as an ultraviolet light (UV) source (e.g., a deep UV light source, an extreme UV light (EUV) source, and/or the like), an x-ray source, an electron beam (e-beam) source, and/or the like. The exposure tool 104 may expose a photoresist layer to the radiation source to transfer a pattern from a photomask to the photoresist layer. The pattern may include one or more semiconductor device layer patterns for forming one or more semiconductor devices, may include a pattern for forming one or more structures of a semiconductor device, may include a pattern for etching various portions of a semiconductor device, and/or the like. In some implementations, the exposure tool 104 includes a scanner, a stepper, or a similar type of exposure tool.

The developer tool 106 is a semiconductor processing tool that is capable of developing a photoresist layer that has been exposed to a radiation source to develop a pattern transferred to the photoresist layer from the exposure tool 104. In some implementations, the developer tool 106 develops a pattern by removing unexposed portions of a photoresist layer. In some implementations, the developer tool 106 develops a pattern by removing exposed portions of a photoresist layer. In some implementations, the developer tool 106 develops a pattern by dissolving exposed or unexposed portions of a photoresist layer through the use of a chemical developer.

The etch tool 108 is a semiconductor processing tool that is capable of etching various types of materials of a substrate, wafer, or semiconductor device. For example, the etch tool 108 may include a wet etch tool, a dry etch tool, and/or the like. In some implementations, the etch tool 108 includes a chamber that is filled with an etchant, and the substrate is placed in the chamber for a particular time period to remove particular amounts of one or more portions of the substrate. In some implementations, the etch tool 108 may etch one or more portions of the substrate using a plasma etch or a plasma-assisted etch, which may involve using an ionized gas to isotropically or directionally etch the one or more portions.

The planarization tool 110 is a semiconductor processing tool that is capable of polishing or planarizing various layers of a wafer or semiconductor device. For example, a planarization tool 110 may include a chemical mechanical planarization (CMP) tool and/or another type of planarization tool that polishes or planarizes a layer or surface of deposited or plated material. The planarization tool 110 may polish or planarize a surface of a semiconductor device with a combination of chemical and mechanical forces (e.g., chemical etching and free abrasive polishing). The planarization tool 110 may utilize an abrasive and corrosive chemical slurry in conjunction with a polishing pad and retaining ring (e.g., typically of a greater diameter than the semiconductor device). The polishing pad and the semiconductor device may be pressed together by a dynamic polishing head and held in place by the retaining ring. The dynamic polishing head may rotate with different axes of rotation to remove material and even out any irregular topography of the semiconductor device, making the semiconductor device flat or planar.

The plating tool 112 is a semiconductor processing tool that is capable of plating a substrate (e.g., a wafer, a semiconductor device, and/or the like) or a portion thereof with one or more metals. For example, the plating tool 112 may include a copper electroplating device, an aluminum electroplating device, a nickel electroplating device, a tin electroplating device, a compound material or alloy (e.g., tin-silver, tin-lead, and/or the like) electroplating device, and/or an electroplating device for one or more other types of conductive materials, metals, and/or similar types of materials.

The ion implantation tool 114 is a semiconductor processing tool that is capable of implanting ions into a substrate. The ion implantation tool 114 may generate ions in an arc chamber from a source material such as a gas or a solid. The source material may be provided into the arc chamber, and an arc voltage is discharged between a cathode and an electrode to produce a plasma containing ions of the source material. One or more extraction electrodes may be used to extract the ions from the plasma in the arc chamber and accelerate the ions to form an ion beam. The ion beam may be directed toward the substrate such that the ions are implanted below the surface of the substrate.

The wafer/die transport tool 116 may be included in a cluster tool or another type of tool that includes a plurality of processing chambers, and may be configured to transport substrates and/or semiconductor devices between the plurality of processing chambers, to transport substrates and/or semiconductor devices between a processing chamber and a buffer area, to transport substrates and/or semiconductor devices between a processing chamber and an interface tool such as an equipment front end module (EFEM), and/or to transport substrates and/or semiconductor devices between a processing chamber and a transport carrier (e.g., a front opening unified pod (FOUP)), among other examples. In some implementations, a wafer/die transport tool 116 may be included in a multi-chamber (or cluster) deposition tool 102, which may include a pre-clean processing chamber (e.g., for cleaning or removing oxides, oxidation, and/or other types of contamination or byproducts from a substrate and/or semiconductor device) and a plurality of types of deposition processing chambers (e.g., processing chambers for depositing different types of materials, processing chambers for performing different types of deposition operations).

In some implementations, one or more of the semiconductor processing tools 102-114 and/or the wafer/die transport tool 116 may perform one or more semiconductor processing operations described herein. For example, one or more of the semiconductor processing tools 102-114 and/or the wafer/die transport tool 116 may form, in a substrate of an image sensor device, one or more photodiodes in a pixel sensor array of the image sensor device; may form a metal layer over the one or more photodiodes and over a sensing region in a BLC region of the image sensor device; may remove first portions of the metal layer in the pixel sensor array to form a metal grid above the one or more photodiodes; and/or may remove second portions of the metal layer in the BLC region to form an anti-reflection array in the metal layer in the BLC region, where the metal layer in the BLC region corresponds to a light-blocking layer over the sensing region in the BLC region, among other examples. One or more of the semiconductor processing tools 102-114 and/or the wafer/die transport tool 116 may perform other semiconductor processing operations described herein, such as in connection with FIGS. 5A-5O, 8A-8D, and/or 12, among other examples.

The number and arrangement of devices shown in FIG. 1 are provided as one or more examples. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the example environment 100 may perform one or more functions described as being performed by another set of devices of the example environment 100.

Figure 2:
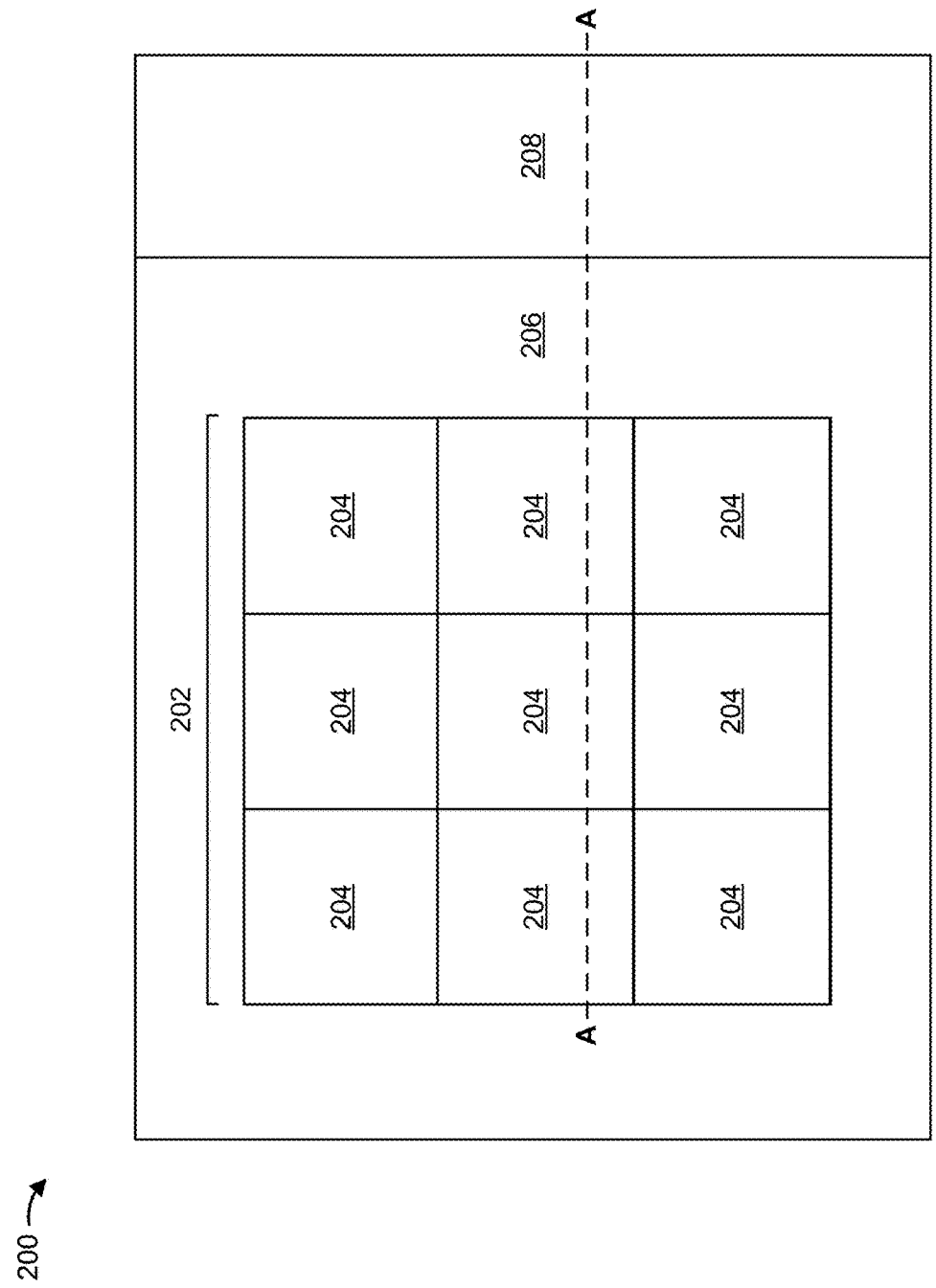
FIG. 2 is a diagram of a top-down view of an example image sensor device described herein.

FIG. 2 is a diagram of a top-down view of an example image sensor device 200 described herein. The image sensor device 200 may include a CMOS image sensor, a back side illuminated (BSI) CMOS image sensor, and/or another type of image sensor. The image sensor device 200 may be configured to be deployed in various implementations, such as digital cameras, video recorders, night-vision cameras, automotive sensors and cameras, and/or other types of light-sensing implementations.

The image sensor device 200 may include a pixel sensor array 202. As shown in FIG. 2, the pixel sensor array 202 may include a plurality of pixel sensors 204. As further shown in FIG. 2, the pixel sensors 204 may be arranged in a grid. In some implementations, the pixel sensors 204 are square-shaped (as shown in the example in FIG. 2). In some implementations, the pixel sensors 204 include other shapes such as circle shapes, octagon shapes, diamond shapes, and/or other shapes.

The pixel sensors 204 may be configured to sense and/or accumulate incident light (e.g., light directed toward the pixel sensor array 202). For example, a pixel sensor 204 may absorb and accumulate photons of the incident light in a photodiode. The accumulation of photons in the photodiode may generate a charge representing the intensity or brightness of the incident light (e.g., a greater amount of charge may correspond to a greater intensity or brightness, and a lower amount of charge may correspond to a lower intensity or brightness).

The pixel sensor array 202 may be electrically connected to a back-end-of-line (BEOL) metallization stack (not shown) of the image sensor. The BEOL metallization stack may electrically connect the pixel sensor array 202 to control circuitry that may be used to measure the accumulation of incident light in the pixel sensors 204 and convert the measurements to an electrical signal.

As further shown in FIG. 2, the image sensor device 200 may include a BLC region 206 adjacent to and/or surrounding a pixel sensor array 202. The BLC region 206 includes one or more layers of light-blocking material that prevents light from entering a sensing region under the one or more layers. The sensing region is "dark" in that the one or more layers prevent incident light from entering the sensing region. This enables the sensing region to generate a dark current measurement for black level correction (or black level calibration) for the pixel sensor array 202. The BLC region 206 may be located approximately 25 microns to approximately 200 microns from an edge of image sensor device 200. However, other values for the range are within the scope of the present disclosure.

As further shown in FIG. 2, the image sensor device 200 may include a bonding pad region 208 (which may also be referred to as an E-pad region) adjacent to the BLC region 206. The bonding pad region 208 may include one or more metallization layers (e.g., conductive bonding pads, e-pads, metallization layers, vias) through which electrical connections between the image sensor device 200 and outside devices and/or external packaging may be established.

In some implementations, the image sensor device 200 includes one or more other regions, such as a scribe line region that separates one semiconductor die or portion of a semiconductor die that includes the image sensor device 200 from an adjacent semiconductor die or portion of the semiconductor die that includes other image sensor devices and/or other integrated circuits.

As indicated above, FIG. 2 is provided as an example. Other examples may differ from what is described with regard to FIG. 2.

Figure 3:
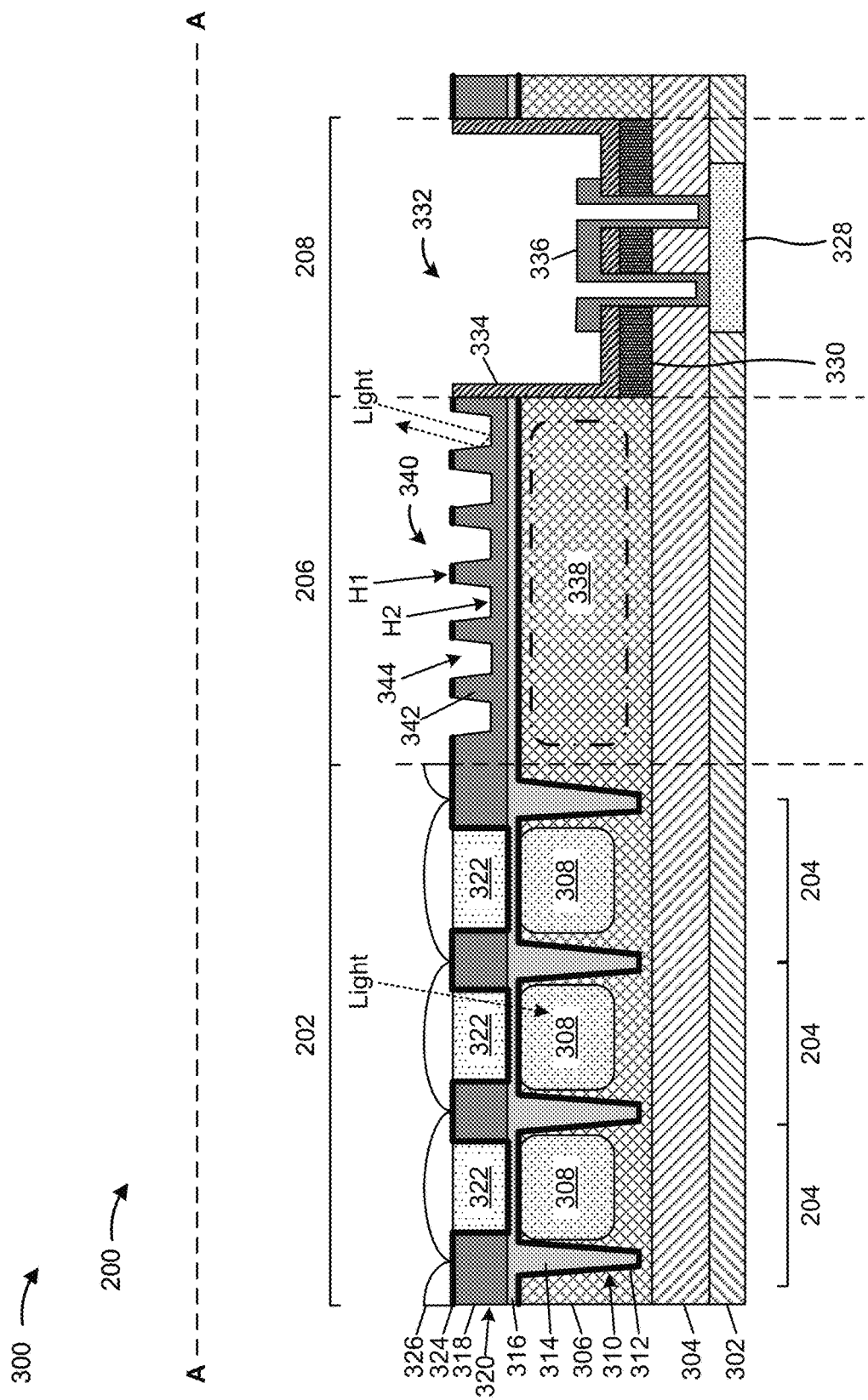
FIG. 3 is a diagram of a cross-sectional view of an example implementation of the image sensor device described herein.

FIG. 3 is a diagram of a cross-sectional view of an example implementation 300 of the image sensor device 200 described herein along the line A-A in FIG. 2. FIG. 3 illustrates a subset of cross-sectional structures and/or layers of the image sensor device 200 included in the pixel sensor array 202, the BLC region 206, and the bonding pad region 208.

As shown in FIG. 3, the image sensor device 200 may include various layers and/or structures. In some implementations, the image sensor device 200 may be mounted and/or fabricated on a carrier substrate (not shown) during one or more semiconductor processing operations to form the image sensor device 200. The image sensor device 200 may include an inter-metal dielectric (IMD) layer 302, an inter-layer dielectric (ILD) layer 304 over and/or on the IMD layer 302, and a substrate 306 over and/or on the ILD layer 304. The IMD layer 302 and the ILD layer 304 may each include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material. The substrate 306 may be formed of silicon (Si), a material including silicon, a III-V compound semiconductor material such as gallium arsenide (GaAs), a silicon on insulator (SOI), or another type of semiconductor material that is capable of generating a charge from photons of incident light.

Various metallization layers may be formed in and/or in between layers of the IMD layer 302. The metallization layers may include bonding pads, conductive lines, and/or other types of conductive structures that electrically connect the various regions of the image sensor device 200 and/or electrically connect the various regions of the image sensor device 200 to one or more external devices and/or external packaging. The metallization layers may be referred to as a BEOL metallization stack, and may include a conductive material such as gold (Au), copper (Cu), silver (Ag), cobalt (Co), tungsten (W), titanium (Ti), ruthenium (Ru), a metal alloy, and/or a combination thereof, among other examples. The BEOL metallization stack may electrically connect the pixel sensor array 202, the BLC region 206, and/or the bonding pad region 208 to a device die on which integrated processing circuitry is included in implementations in which the image sensor device 200 includes a plurality of stacked and bonded semiconductor dies.

Photodiodes 308 for the pixel sensors 204 in the pixel sensor array 202 may be included in the substrate 306. A photodiode 308 may include a region of the substrate 306 that is doped with a plurality of types of ions to form a p-n junction or a PIN junction (e.g., a junction between a p-type portion, an intrinsic (or undoped) type portion, and an n-type portion). For example, the substrate 306 may be doped with an n-type dopant to form a first portion (e.g., an n-type portion) of a photodiode 308 and a p-type dopant to form a second portion (e.g., a p-type portion) of the photodiode 308. A photodiode 308 may be configured to absorb photons of incident light. The absorption of photons causes a photodiode 308 to accumulate a charge (referred to as a photocurrent) due to the photoelectric effect. Here, photons bombard the photodiode 308, which causes emission of electrons of the photodiode 308. The emission of electrons causes the formation of electron-hole pairs, where the electrons migrate toward the cathode of the photodiode 308 and the holes migrate toward the anode, which produces the photocurrent.

A deep trench isolation (DTI) structure 310 may be included in the substrate 306. The DTI structure 310 may include trenches that extend from a top surface of the substrate 306 and into the substrate 306 around the photodiodes 308 of the pixel sensors 204. In this way, the photodiodes 308 are surrounded by the trenches of the DTI structure 310. In some implementations, the DTI structure 310 may be a backside DTI (BDTI) structure that is formed as a part of back side processing of the image sensor device 200.

The trenches of the DTI structures 310 may provide optical isolation between the pixel sensors 204 of the pixel sensor array 202, which may reduce the amount of optical crosstalk between adjacent pixel sensors 204. In particular, the trenches of the DTI structures 310 may absorb, refract, and/or reflect incident light, which may reduce the amount of incident light that travels through a pixel sensor 204 into an adjacent pixel sensor 204 and is absorbed by the adjacent pixel sensor 204.

The top surface of the substrate 306 and the surfaces of the DTI structure 310 may be coated with an antireflective coating (ARC) 312 to decrease reflection of incident light away from the photodiodes 308 and to increase transmission of incident light into the substrate 306 and the photodiodes 308. The ARC 312 may include a suitable material for reducing a reflection of incident light projected toward the photodiodes 308, such as a nitrogen-containing material or other examples.

The DTI structure 310 may include an oxide layer 314 above the substrate 306 and above and/or on the ARC 312. Moreover, the material of the oxide layer 314 may fill the trenches of the DTI structure 310. The oxide layer 314 may be combined with an adhesion layer 316 between the substrate 306 and the upper layers of the pixel sensor array 202. The adhesion layer 316 may extend into and through the BLC region 206 to promote adhesion between the silicon of the substrate 306 and the metal material(s) of a metal layer 318 above the substrate 306. In some implementations, the oxide layer 314 and the adhesion layer 316 may be a singular structure that includes an oxide material such as a silicon oxide ($SiO_x$). In some implementations, a silicon nitride ($SiN_x$), a silicon carbide ($SiC_x$), or a mixture thereof, such as a silicon carbon nitride (SiCN), a silicon oxynitride (SiON), or another dielectric material is used in place of the oxide layer 314 as the adhesion layer 316.

The metal layer 318 may be located over and/or on the adhesion layer 316. The metal layer 318 may extend laterally across the pixel sensor array 202, the BLC region 206, and/or another region of the image sensor device 200. A metal grid 320 may be formed in the metal layer 318 in the pixel sensor array 202 to provide optical isolation between pixel sensors 204 in the pixel sensor array 202. The metal grid 320 may include columns or pillars surrounding the pixel sensors 204. The columns or pillars of the metal grid 320 may be located over the trenches of the DTI structure 310. The metal layer 318 may be formed of a metal material, such as gold (Au), copper (Cu), silver (Ag), cobalt (Co), tungsten (W), titanium (Ti), ruthenium (Ru), a metal alloy (e.g., aluminum copper (AlCu)), and/or a combination thereof, among other examples.

Color filter regions 322 of the pixel sensors 204 may be included between the metal grid 320. In other words, the color filter regions 322 may be included in place of removed portions of the metal layer 318 above the photodiodes 308. Each color filter region 322 may be configured to filter incident light to allow a particular wavelength of the incident light to pass to a photodiode 308 of an associated pixel sensor 204. For example, a color filter region 322 included in a pixel sensor 204 may filter red light (and thus, the pixel sensor 204 may be a red pixel sensor). As another example, a color filter region 322 included in a pixel sensor 204 may filter green light (and thus, the pixel sensor 204 may be a green pixel sensor). As another example, a color filter region 322 included in a pixel sensor 204 may filter blue light (and thus, the pixel sensor 204 may be a blue pixel sensor).

A blue filter region may permit the component of incident light near a 450 nanometer wavelength to pass through a color filter region 322 and block other wavelengths from passing. A green filter region may permit the component of incident light near a 550 nanometer wavelength to pass through a color filter region 322 and block other wavelengths from passing. A red filter region may permit the component of incident light near a 650 nanometer wavelength to pass through a color filter region 322 and block other wavelengths from passing. A yellow filter region may permit the component of incident light near a 580 nanometer wavelength to pass through a color filter region 322 and block other wavelengths from passing.

In some implementations, the color filter region 322 may be non-discriminating or non-filtering, which may define a white pixel sensor. A non-discriminating or non-filtering color filter region 322 may include a material that permits all wavelengths of light to pass into the associated photodiode 308 (e.g., for purposes of determining overall brightness to increase light sensitivity for the image sensor). In some implementations, a color filter region 322 may be a near infrared (NIR) bandpass color filter region, which may define an NIR pixel sensor. An NIR bandpass color filter region 322 may include a material that permits the portion of incident light in an NIR wavelength range to pass to an associated photodiode 308 while blocking visible light from passing.

One or more passivation layers may be formed above and/or on the metal layer 318. For example, an oxide layer 324 may be located over and/or on portions of the metal layer 318. In some implementations, the oxide layer 324 may also be included over and/or on portions of the adhesion layer 316 that are exposed through the metal layer 318. Here, the oxide layer 324 is included between the color filter regions 322 and the adhesion layer 316, and between the color filter regions 322 and the metal layer 318. The oxide layer 324 may include an oxide material such as a silicon oxide ($SiO_x$). Additionally and/or alternatively, a silicon nitride ($SiN_x$), a silicon carbide ($SiC_x$), or a mixture thereof, such as a silicon carbon nitride (SiCN), a silicon oxynitride (SiON), or another dielectric material is used in place of the oxide layer 324.

A micro-lens layer 326 may be included over and/or on the color filter regions 322 and over and/or on the metal grid 320. The micro-lens layer 326 may include a respective micro-lens for each of the pixel sensors 204. A micro-lens may be formed to focus incident light toward the photodiode 308 of a pixel sensor 204.

As shown in the bonding pad region 208 of the image sensor device 200, electrical connections may be formed to a metallization layer 328 in the IMD layer 302. A shallow trench isolation (STI) region 330 may be located above and/or over the metallization layer 328. The STI region 330 may provide electrical isolation in the bonding pad region 208. The STI region 330 may be located below and/or under a recess 332 in the bonding pad region 208. Above, the STI region 330, a buffer oxide layer 334 may be included in the recess 332 on sidewalls and on the bottom surface of the recess 332. A bonding pad 336 may be located in the bonding pad region 208 above the STI region 330, and/or above and/or on the buffer oxide layer 334. The bonding pad 336 may extend through the buffer oxide layer 334, through the STI region 330, and through the ILD layer 304 to the IMD layer 302, and may contact the metallization layer 328 in the IMD layer 302. The bonding pad 336 may include a conductive material, such as such as gold (Au), copper (Cu), silver (Ag), cobalt (Co), tungsten (W), titanium (Ti), ruthenium (Ru), a metal alloy (e.g., aluminum copper (AlCu)), and/or a combination thereof, among other examples.

As shown in the BLC region 206, a sensing region 338 may be included in the substrate 306. The sensing region 338 may include a portion of the substrate 306 under the metal layer 318. The metal layer 318 in the BLC region 206 may function as light-blocking material that prevents light from entering the sensing region 338. This enables the sensing region to generate a dark current measurement for black level correction (or black level calibration) for the pixel sensor array 202.

As further shown in FIG. 3, an anti-reflection array 340 may be included in the metal layer 318 in the BLC region 206. In particular, the anti-reflection array 340 may be included over the sensing region 338. The anti-reflection array 340 includes holes, trenches, and/or other structural features that are configured to reduce the likelihood of light being reflected off of the metal layer 318 and toward the pixel sensor array 202. In this way, the anti-reflection array 340 is configured to impede incident light from being reflected off of the BLC region 206 toward the pixel sensor array 202, which may reduce the likelihood of occurrence of flares or hot spots in images and/or videos generated by the image sensor device 200. This may increase the image quality of the images and/or videos generated by the image sensor device 200.

The anti-reflection array 340 may include a plurality of non-recessed portions 342 that define a plurality of recessed portions 344 in the metal layer 318 (e.g., in the light-blocking layer of the BLC region 206). A top surface of the metal layer 318 (e.g., the light-blocking layer) in a non-recessed portion 342 may be located at a first height H1 in the image sensor device 200. The top surface of the metal layer 318 in a recessed portion 344 may be located at a second height H2 in the image sensor device 200. The first height H1 may be greater relative to the second height H2. The different heights of the anti-reflection array 340 in the metal layer 318 (e.g., the first height H1, the second height H2) results in incident light being scattered in an omnidirectional manner as opposed to being primarily redirected toward the pixel sensor array 202. As an example, and as shown in FIG. 3, light may enter and may reflect off of a recessed portion 344 in the anti-reflection array 340. The light may then be reflect off of a sidewall of a non-recessed portion 342, which results in the light being directed away from the pixel sensor array 202.

As indicated above, FIG. 3 is provided as an example. Other examples may differ from what is described with regard to FIG. 3.

Figure 4:
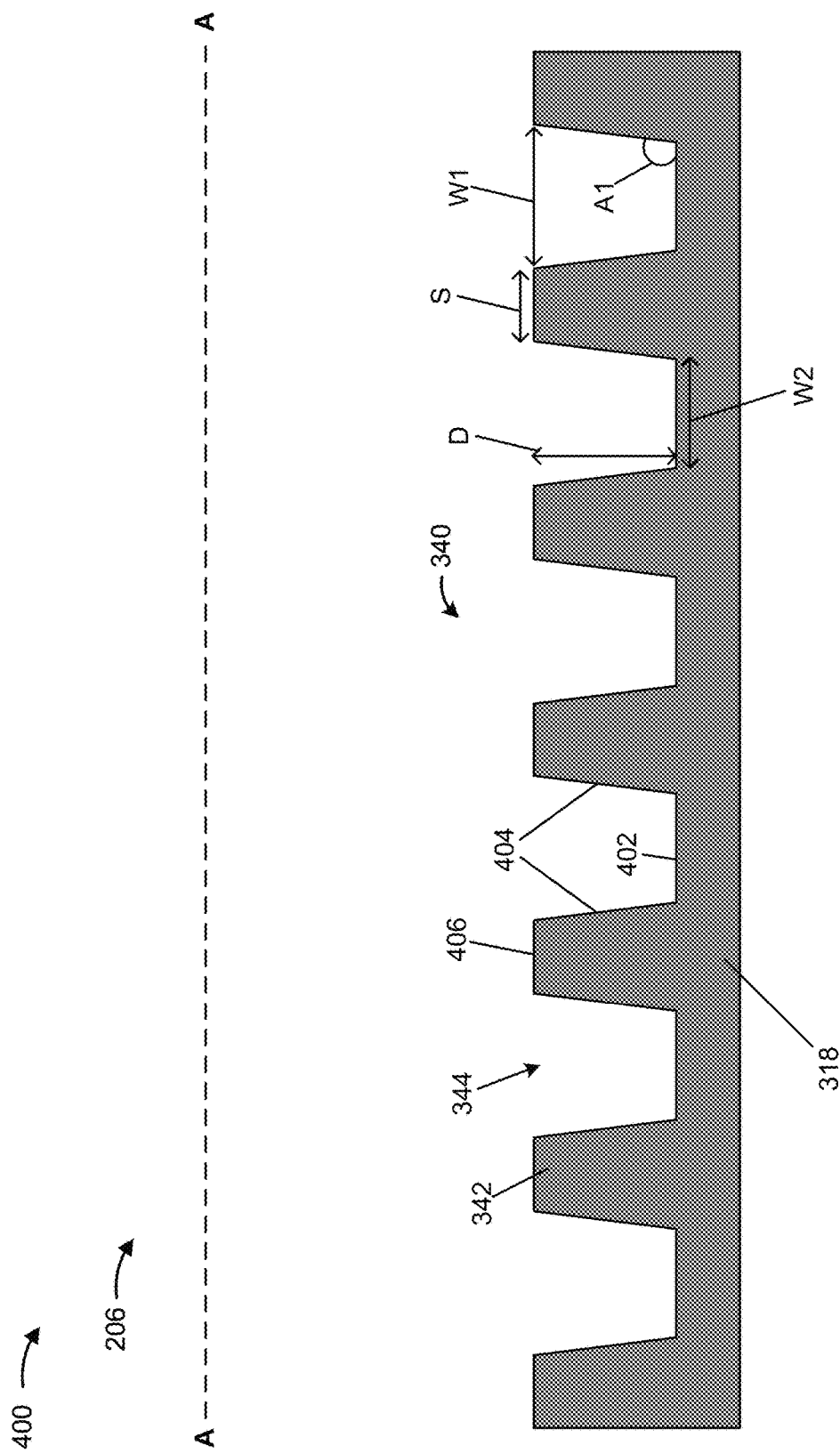
FIG. 4 is a diagram illustrating an example implementation of an anti-reflection array described herein.

FIG. 4 is a diagram illustrating an example implementation 400 of an anti-reflection array 340 described herein. The anti-reflection array 340 may be included in a metal layer 318 (e.g., a light-blocking layer) in a BLC region 206 of an image sensor device 200 described herein.

As shown in FIG. 4, a recessed portion 344 of the anti-reflection array 340 may include a bottom surface 402 (corresponding to a top surface of the metal layer 318) and sidewalls 404. A non-recessed portion 342 may also include sidewalls 404 (which may correspond to the sidewalls 404 of recessed portions 344) and a top surface 406 (corresponding to the top surface of the metal layer 318).

As further shown in FIG. 4, an example dimension of the anti-reflection array 340 may include an angle A1 between a bottom surface 402 of a recessed portion 344 and an adjacent sidewall 404 of the recessed portion 344. In some implementations, the angle A1 may be included in a range of 90 degrees to approximately 96 degrees. However, other values for the range are within the scope of the present disclosure. The angle A1 may be selected based on a use case for the image sensor device 200, an intended application for the image sensor device 200, an estimated angle of incidence of incident light in the intended use case for the image sensor device 200, and/or based on another parameter. In general, the angle A1 may be selected to reduce the likelihood and/or the amount of incident light that is reflected toward the pixel sensor array 202 of the image sensor device 200.

Another example dimension of the anti-reflection array 340 may include a width W1 of an opening of a recessed portion 344. The width W1 may correspond to the cross-sectional width of the recessed portion 344 at the top of the recessed portion 344, as shown in FIG. 4. In some implementations, the width W1 is included in a range of approximately 0.5 microns to approximately 1 micron to enable light to be reflected away from the pixel sensor array 202 while enabling the recessed portion 344 to be formed to a sufficient depth. However, other values for the range are within the scope of the present disclosure.

Another example dimension of the anti-reflection array 340 may include a width W2 of a bottom surface 402 of a recessed portion 344 between the sidewalls 404 of the recessed portion 344. In some implementations, the width W2 is included in a range of approximately 0.25 microns to approximately 0.5 microns to enable light to be reflected away from the pixel sensor array 202 while enabling the recessed portion 344 to be formed to a sufficient depth. However, other values for the range are within the scope of the present disclosure. In some implementations, a ratio of the width W1 to the width W2 is included in a range of approximately 1:1 to approximately 2:1 to enable light to be reflected away from the pixel sensor array 202 while enabling the recessed portion 344 to be formed to a sufficient depth. However, other values for the range are within the scope of the present disclosure.

Another example dimension of the anti-reflection array 340 may include a depth D1 of a recessed portion 344. The depth D1 may correspond to the difference between the height H1 of the top surface of the metal layer 318 in a non-recessed portion 342 and the height H2 of the top surface of the metal layer 318 in the recessed portion 344. In other words, the depth D1 may correspond to the difference in height between the bottom surface 402 of the recessed portion 344 and the top surface 406 of the non-recessed portion 342. In some implementations, the depth D1 is included in a range of approximately 0.1 microns to approximately 0.18 microns to enable light to be reflected away from the pixel sensor array 202 while providing a sufficient remaining thickness for the metal layer 318 in the recessed portion 344 to still block light from propagating through the metal layer 318 and into an underlying sensing region 338. However, other values for the range are within the scope of the present disclosure. In some implementations, a ratio of the depth D1 to the thickness of the metal layer 318 is included in a range of approximately 0.5:1 to approximately 0.9:1 to enable light to be reflected away from the pixel sensor array 202 while providing a sufficient remaining thickness for the metal layer 318 in the recessed portion 344 to still block light from propagating through the metal layer 318 and into an underlying sensing region 338. However, other values for the range are within the scope of the present disclosure.

Another example dimension of the anti-reflection array 340 may include a spacing S between adjacent recessed portions 344. The spacing S may correspond to a width of a top surface 406 of a non-recessed portion 342 between the adjacent recessed portions 344. In some implementations, the spacing S is included in a range of approximately 0.5 microns to approximately 1 micron to enable light to be reflected away from the pixel sensor array 202 while enabling the recessed portion 344 to be formed to a sufficient depth. However, other values for the range are within the scope of the present disclosure.

As indicated above, FIG. 4 is provided as an example. Other examples may differ from what is described with regard to FIG. 4.

Figure 5A:
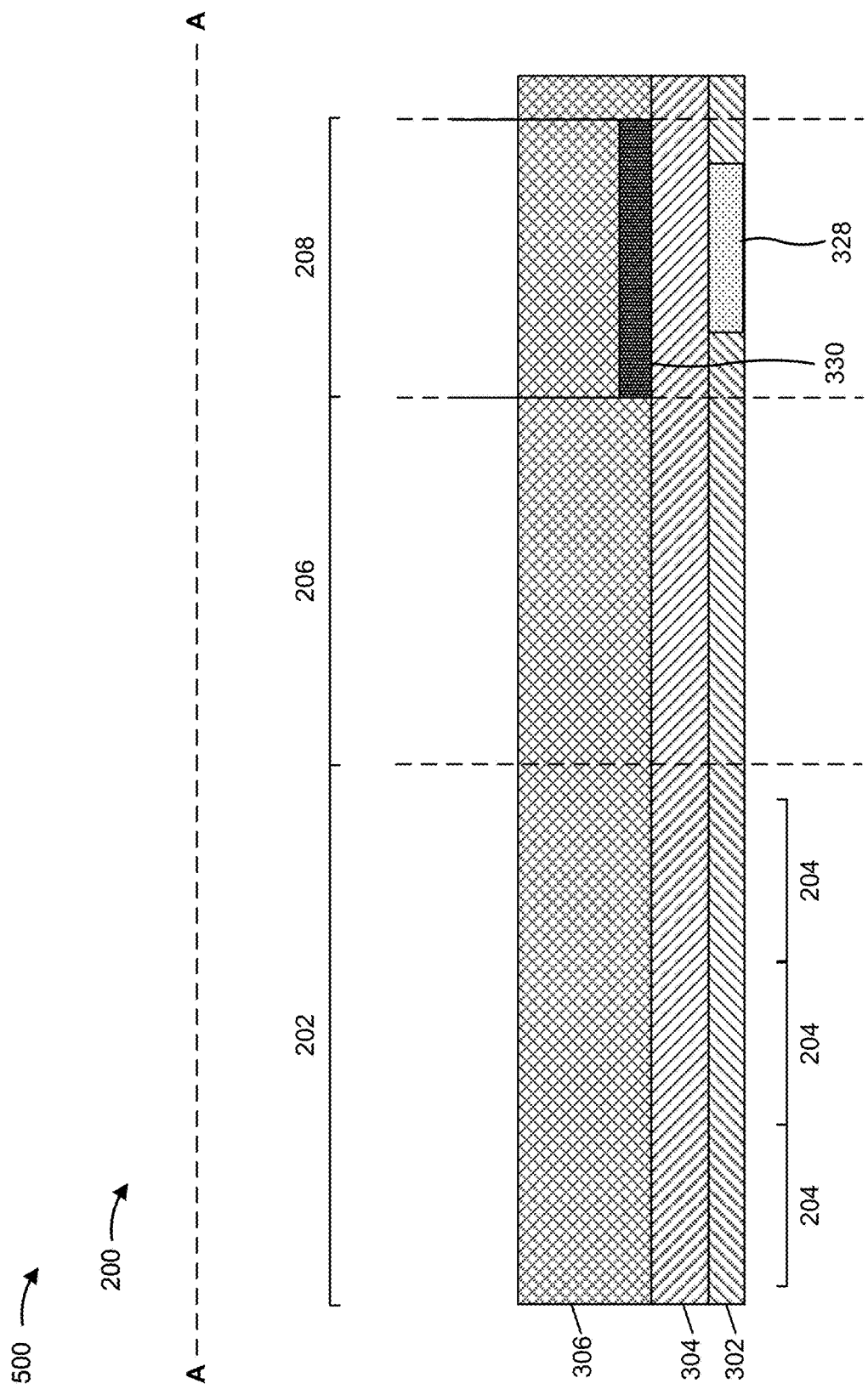
FIGS. 5A-5O are diagrams of an example implementation described herein.
Figure 5B:
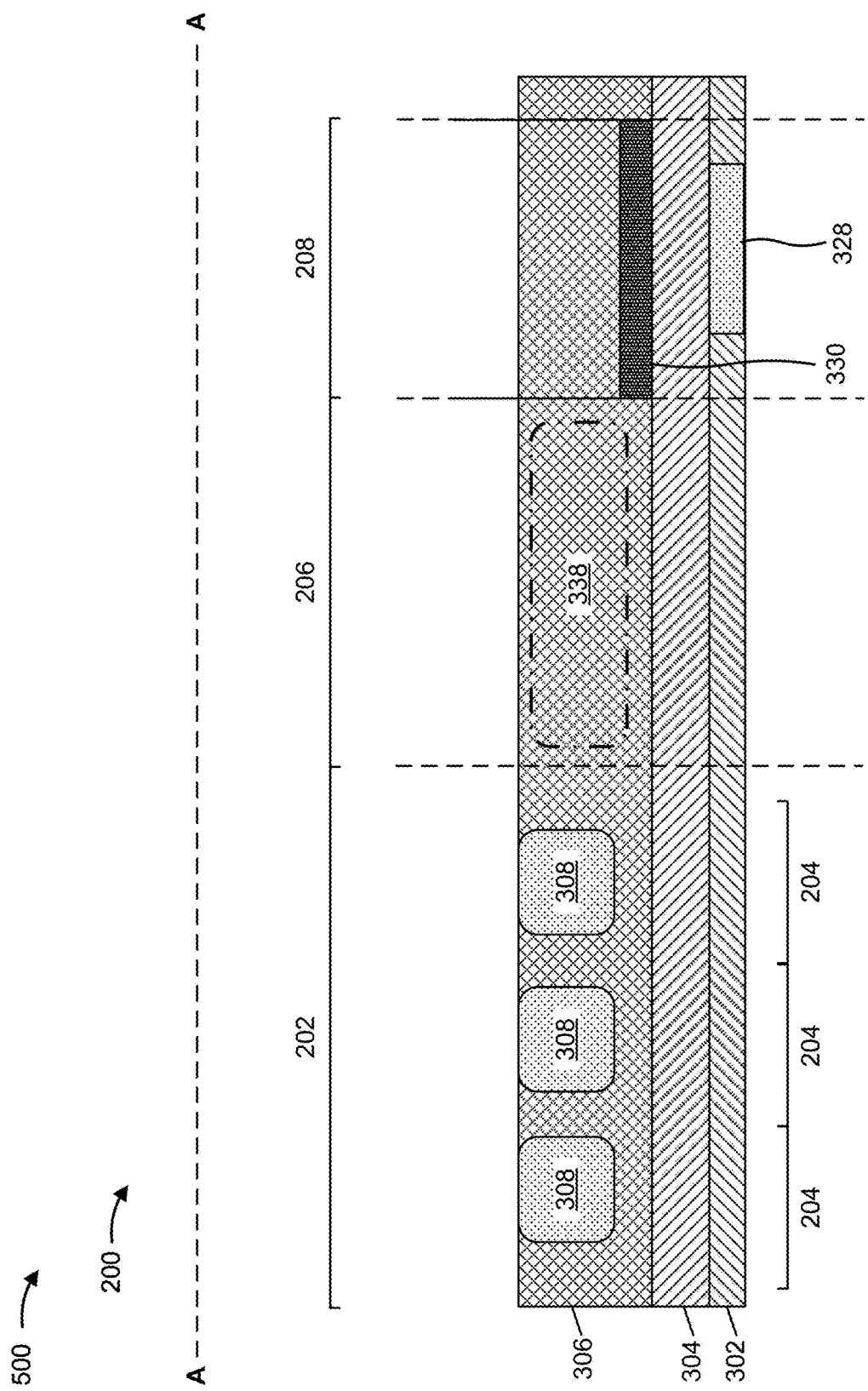
Figure 5C:
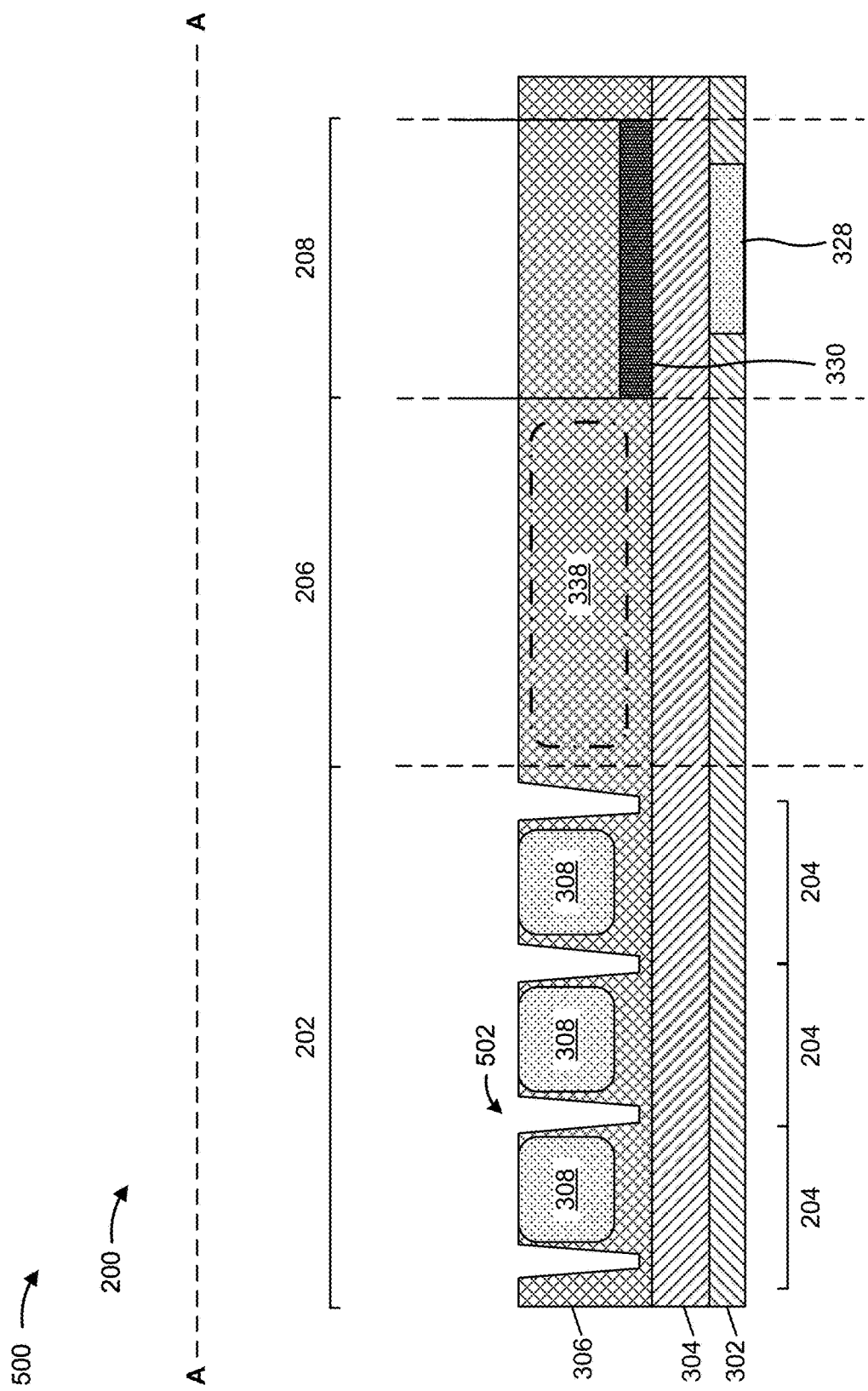
Figure 5D:
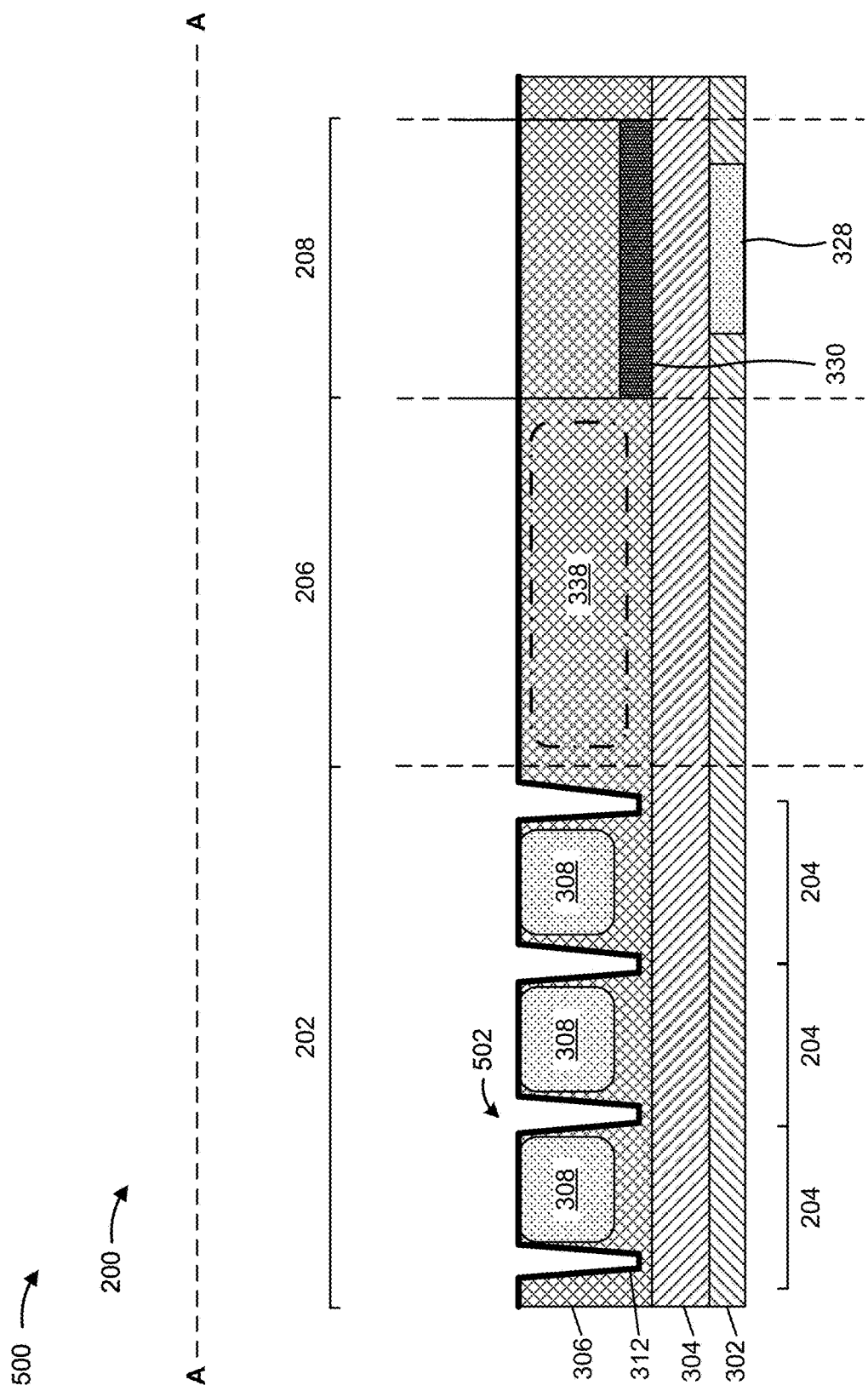
Figure 5E:
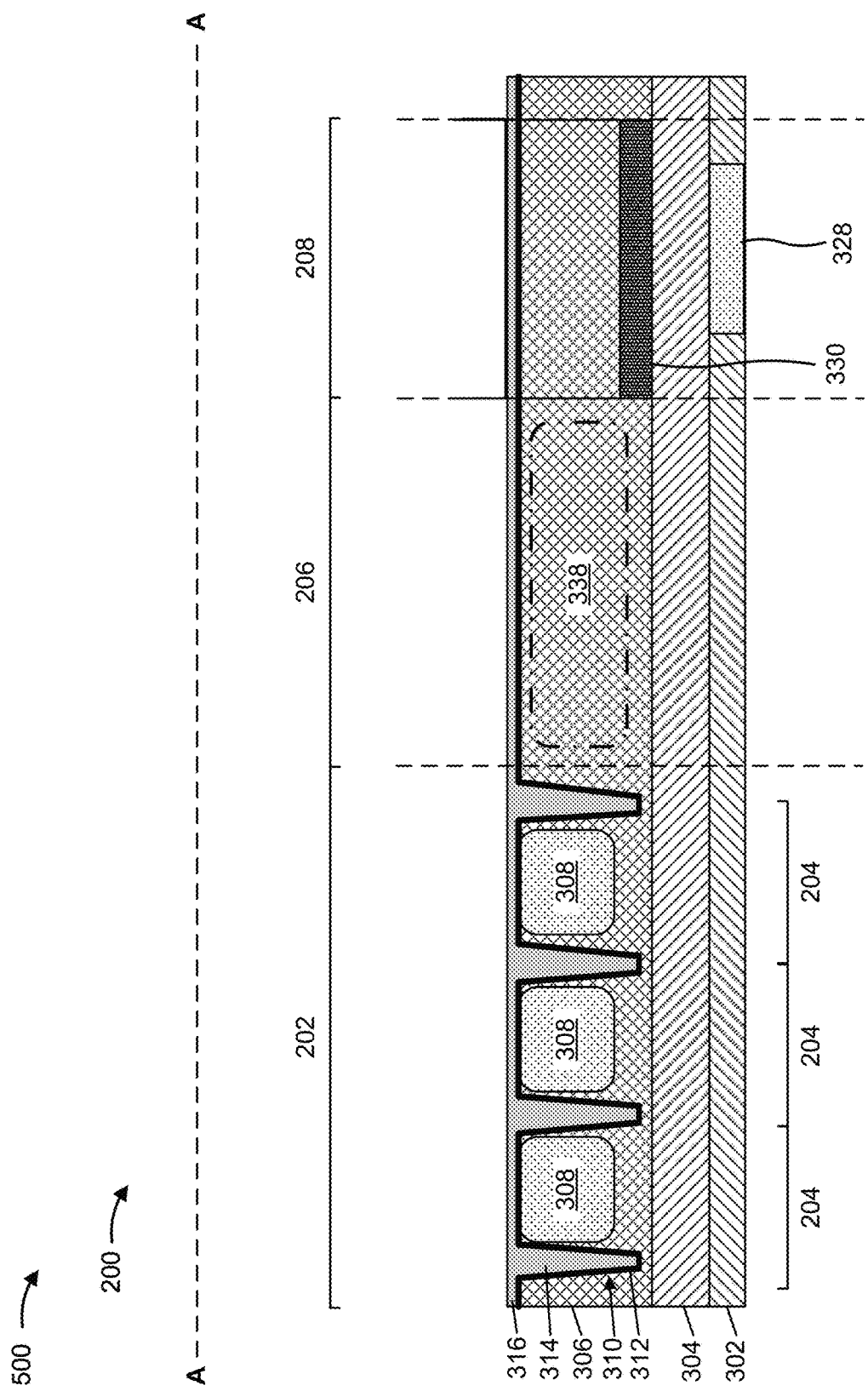
Figure 5F:
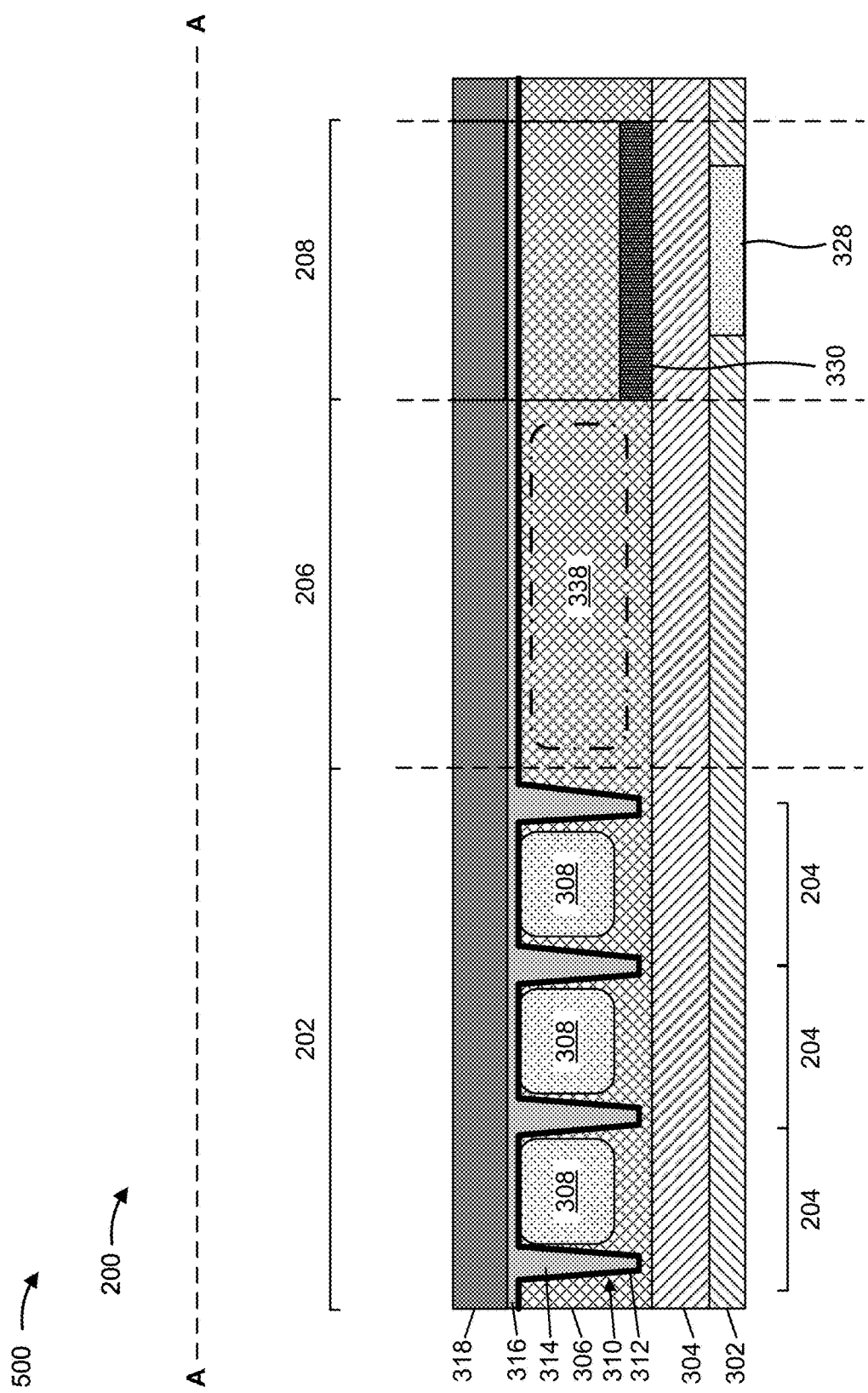
Figure 5G:
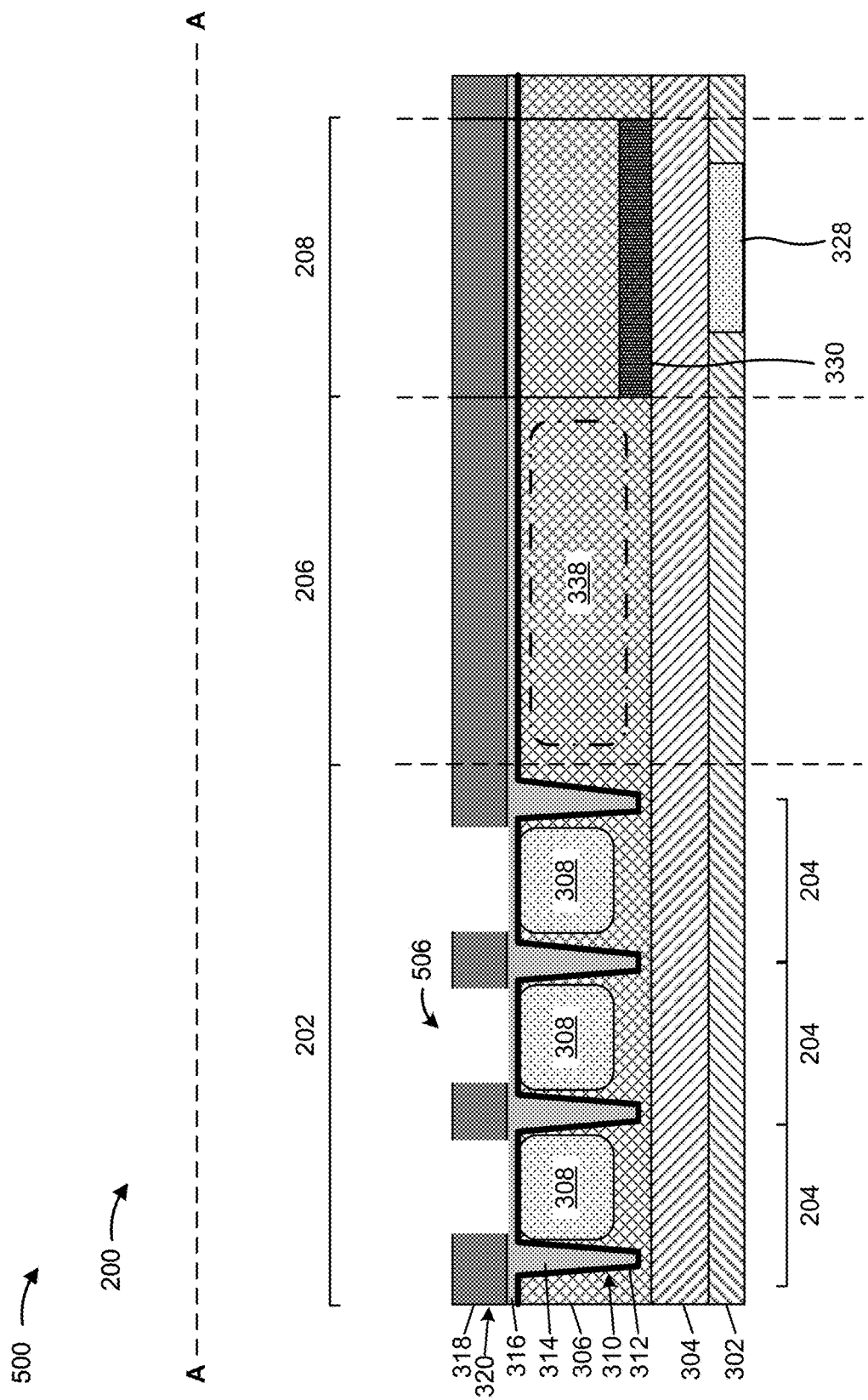
Figure 5H:
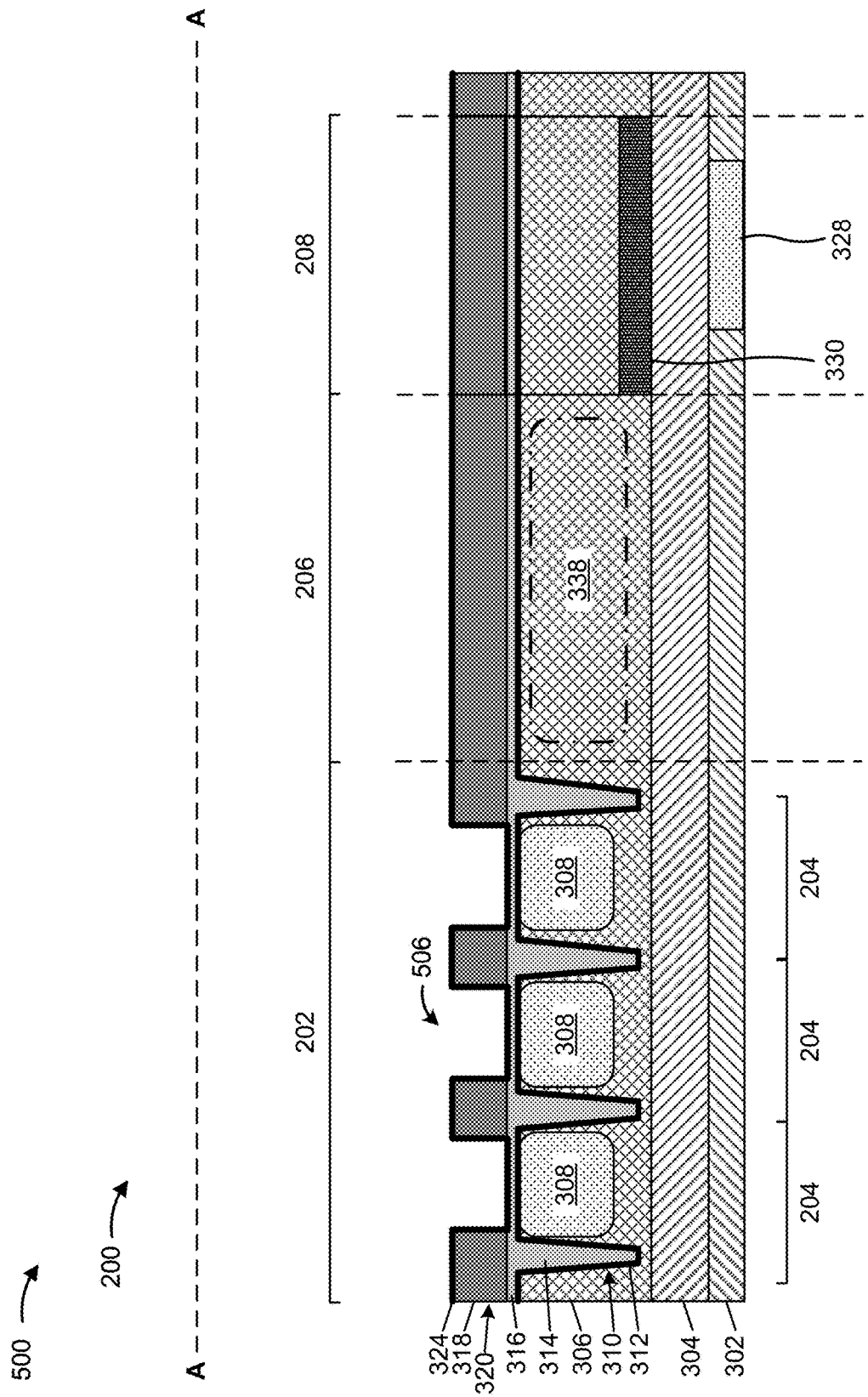
Figure 5I:
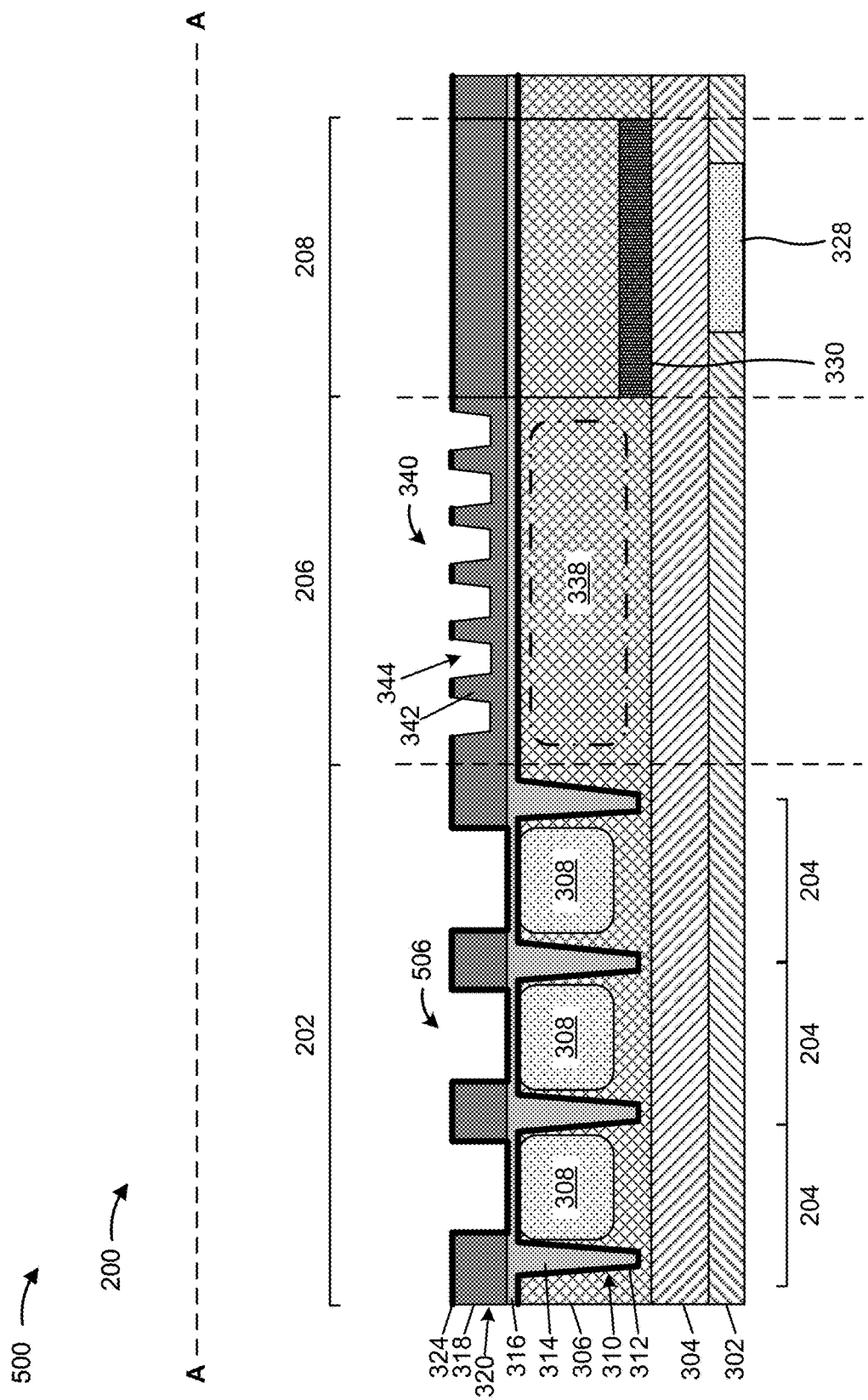
Figure 5J:
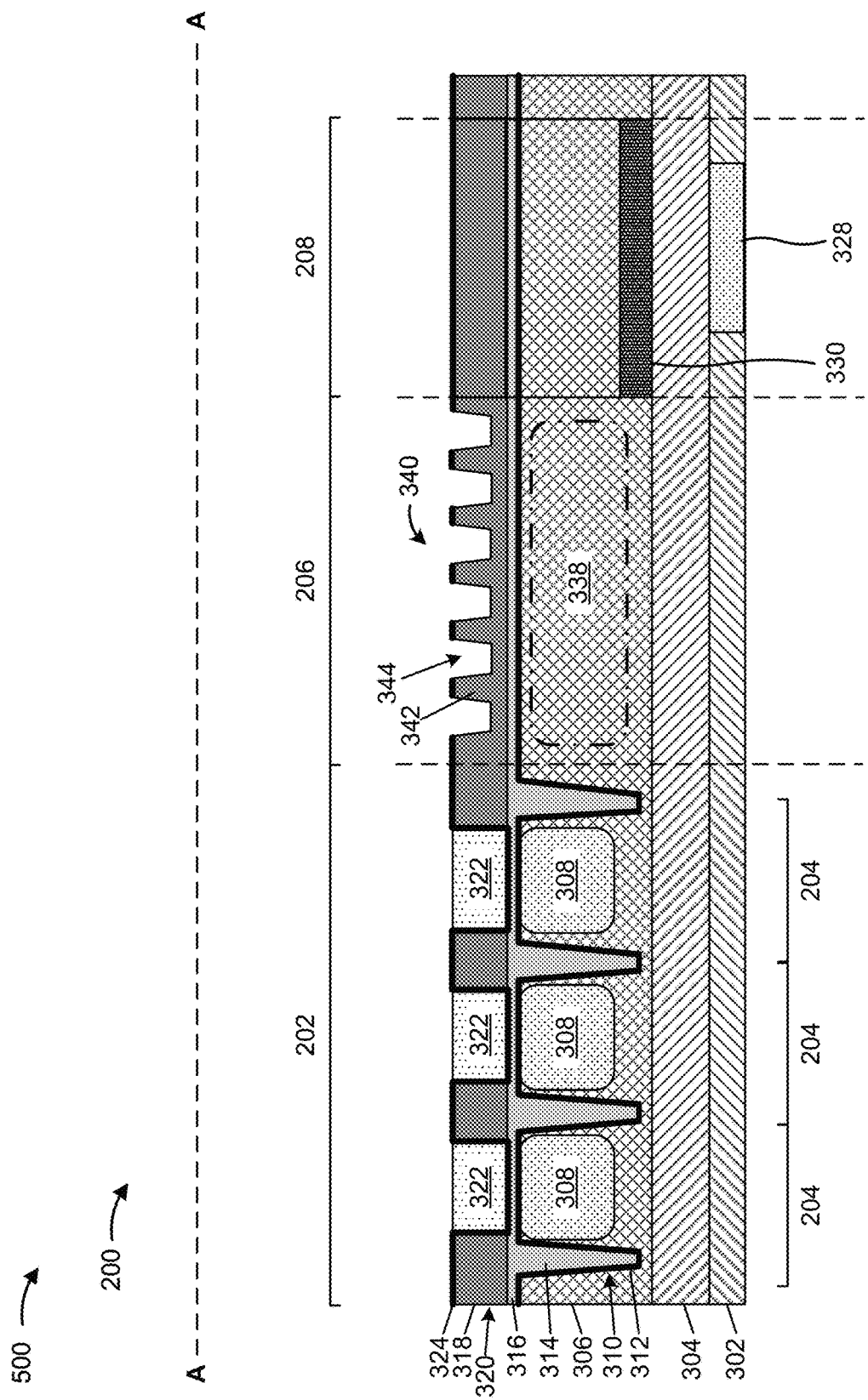
Figure 5K:
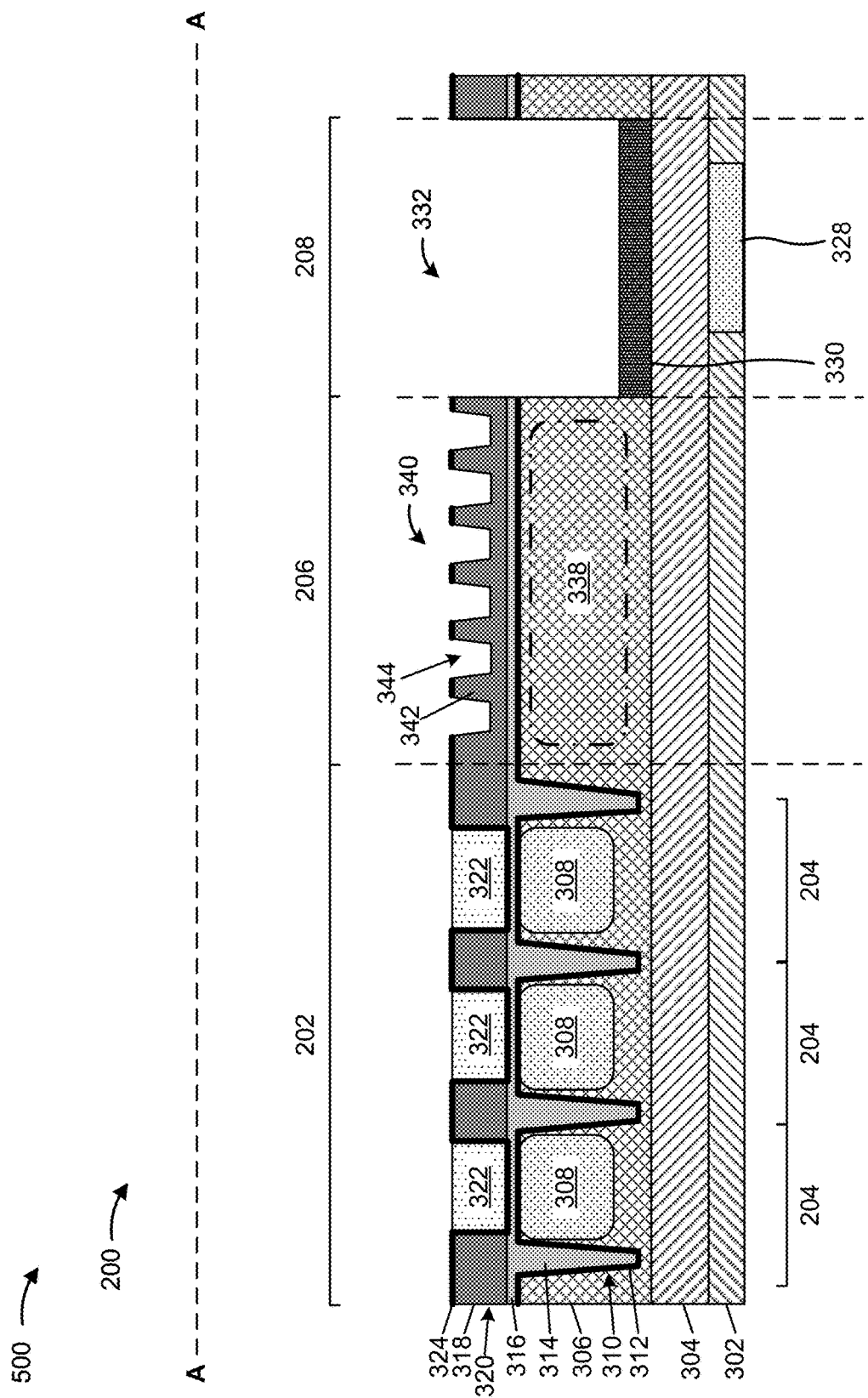
Figure 5L:
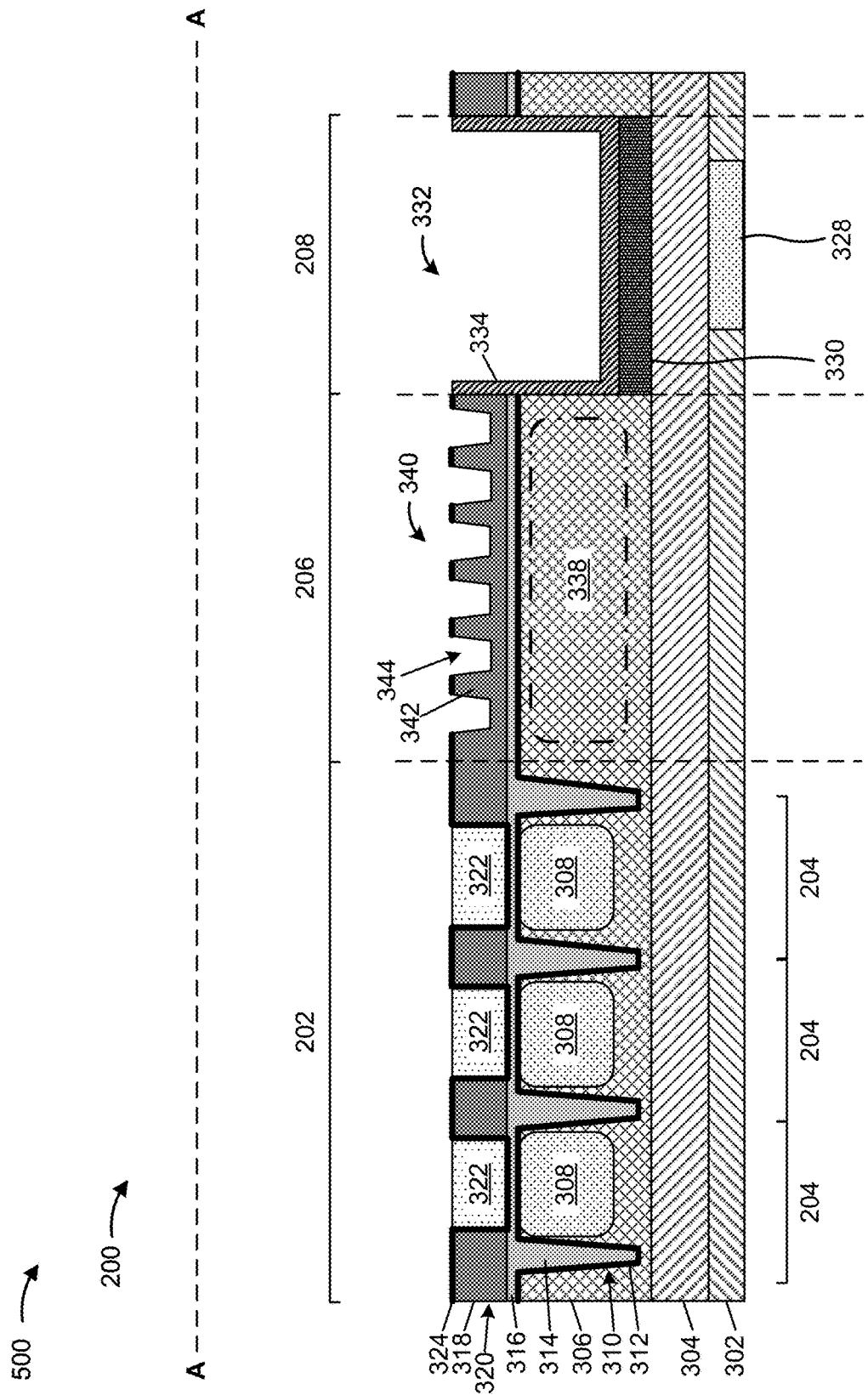
Figure 5M:
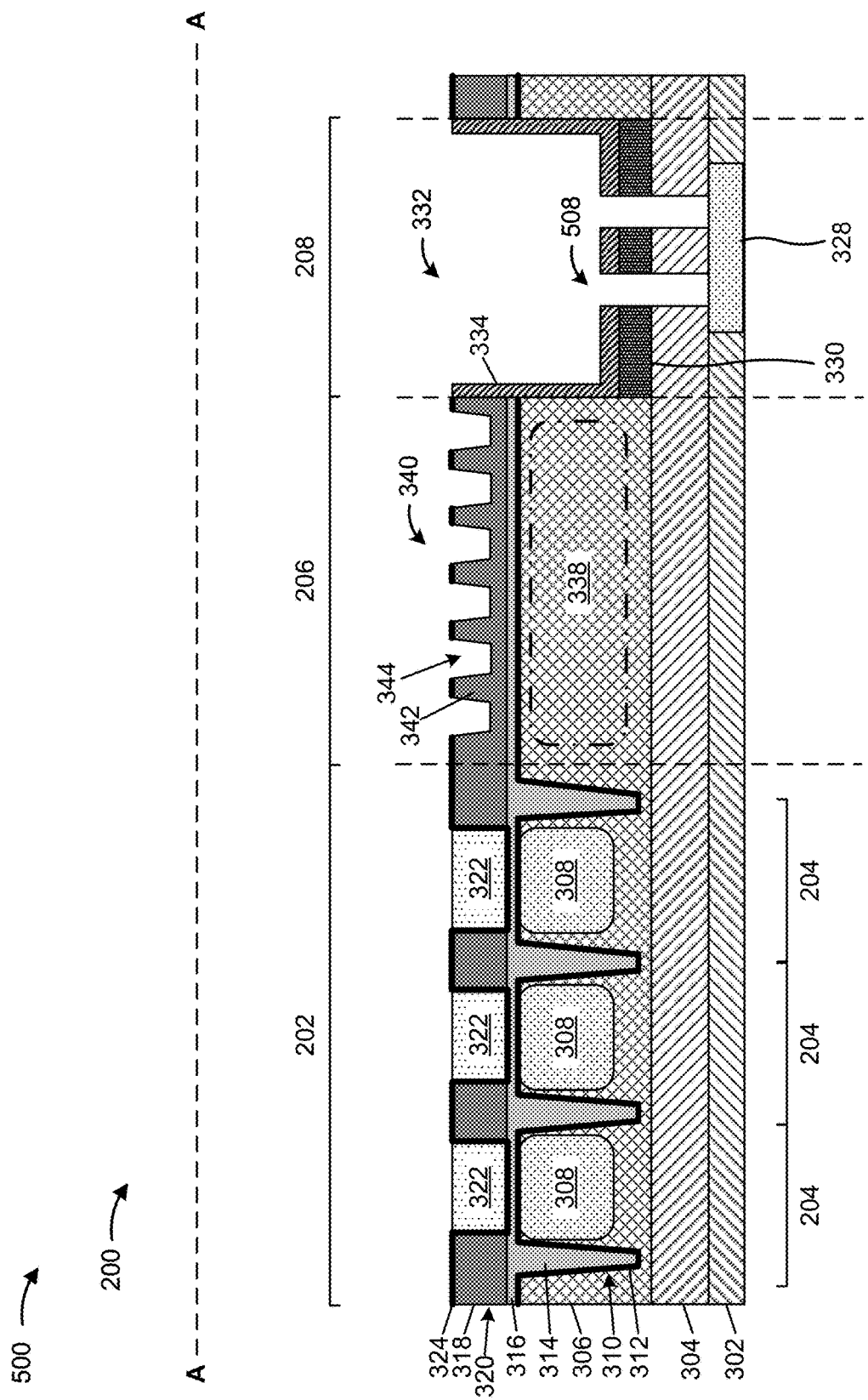
Figure 5N:
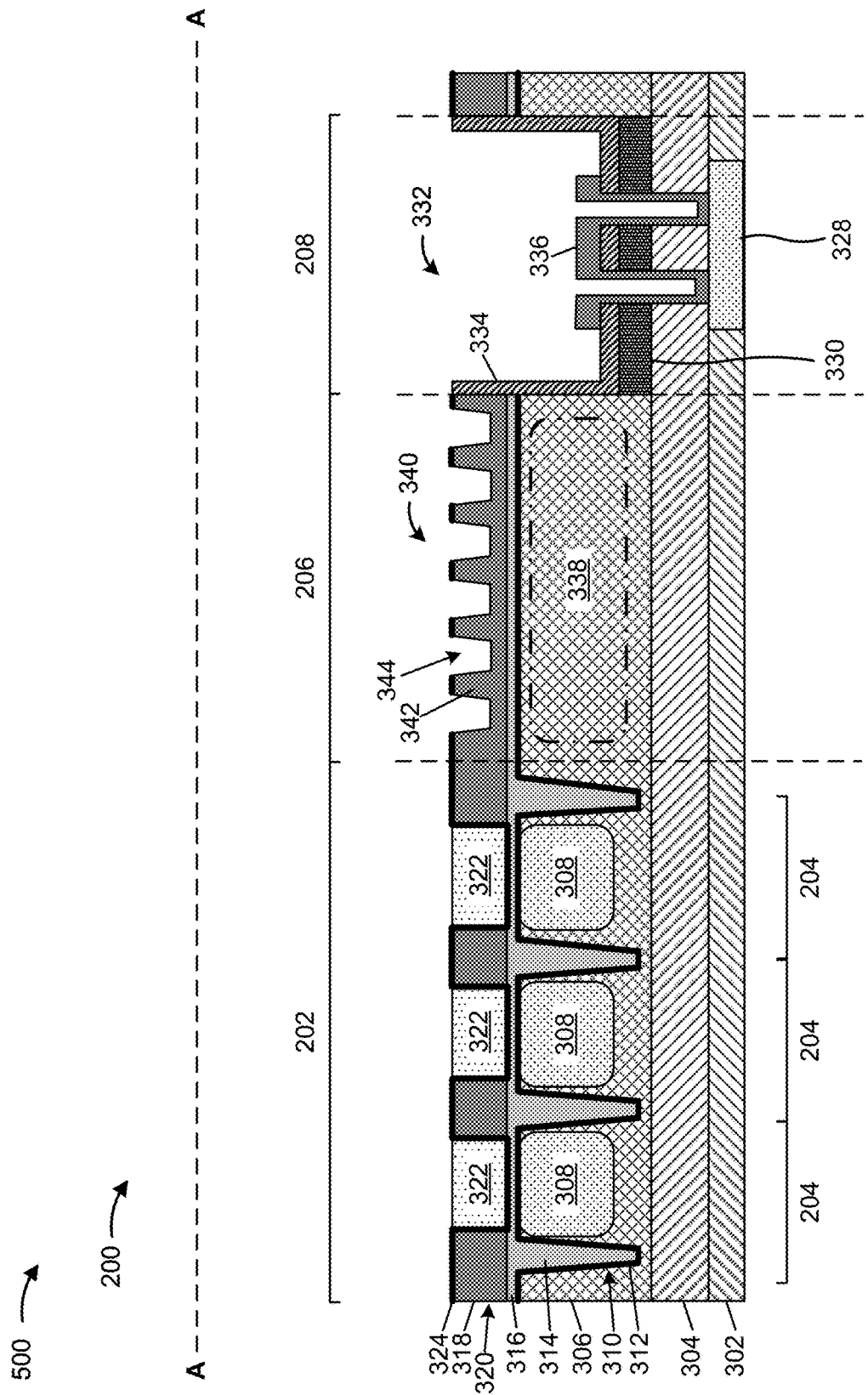
Figure 5O:
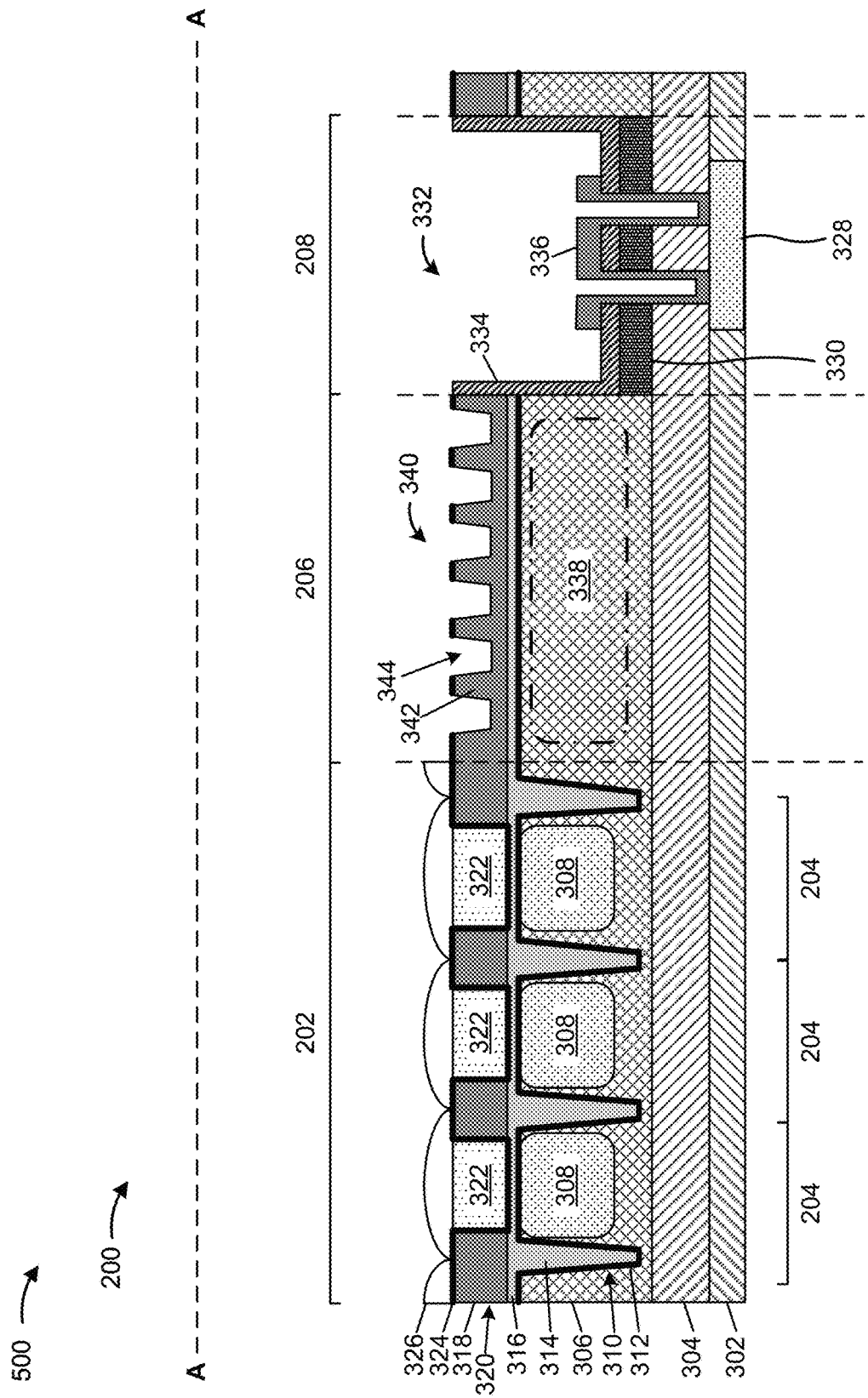

FIGS. 5A-5O are diagrams of an example implementation 500 described herein. Example implementation 500 may be an example process for forming an image sensor device 200 described herein. The image sensor device 200 may include a pixel sensor array 202 including a plurality of pixel sensors 204, a BLC region 206 including an anti-reflection array 340, and a bonding pad region 208, among other examples.

As shown in FIG. 5A, the image sensor device 200 may include a plurality of layers, including an IMD layer 302, an ILD layer 304, and the substrate 306, among other examples. In some implementations, the substrate 306 may be provided as a semiconductor wafer or another type of semiconductor work piece. In some implementations, the deposition tool 102 may deposit the IMD layer 302 and/or the ILD layer 304 in a PVD operation, an ALD operation, a CVD operation, an epitaxy operation, an oxidation operation, another type of deposition operation described in connection with FIG. 1, and/or another suitable deposition operation. In some implementations, the planarization tool 110 planarizes the IMD layer 302 and/or the ILD layer 304 after the deposition tool 102 deposits the IMD layer 302 and/or the ILD layer 304.

As further shown in FIG. 5A, an STI region 330 may be formed in the substrate 306 (e.g., prior to formation of the IMD layer 302 and/or the ILD layer 304). The STI region 330 may be formed in the bonding pad region 208 of the image sensor device 200. In some implementations, the deposition tool 102 may deposit the STI region 330 in a PVD operation, an ALD operation, a CVD operation, an epitaxy operation, an oxidation operation, another type of deposition operation described in connection with FIG. 1, and/or another suitable deposition operation. In some implementations, the planarization tool 110 planarizes the STI region 330 after the deposition tool 102 deposits the STI region 330. In some implementations, the etch tool 108 may form a recess in the substrate 306, and the STI region 330 may be formed in the recess.

As further shown in FIG. 5A, a metallization layer 328 may be formed in the IMD layer 302. The IMD layer 302 may be formed in the bonding pad region 208 of the image sensor device 200. In some implementations, the etch tool 108 may form a recess in the IMD layer 302, and the metallization layer 328 may be formed in the recess. The deposition tool 102 and/or the plating tool 112 may deposit the metallization layer 328 in a CVD operation, a PVD operation, an ALD operation, an electroplating operation, another deposition operation described above in connection with FIG. 1, and/or another suitable deposition operation. In some implementations, a seed layer is first deposited, and the metallization layer 328 is deposited on the seed layer. In some implementations, the planarization tool 110 planarizes the metallization layer 328 after the deposition tool 102 and/or the plating tool 112 deposits the metallization layer 328.

As shown in FIG. 5B, one or more semiconductor processing tools may form a plurality of photodiodes 308 in the substrate 306. For example, the ion implantation tool 114 may dope the portions of the substrate 306 using an ion implantation technique to form a respective photodiode 308 for a plurality of pixel sensors 204. The substrate 306 may be doped with a plurality of types of ions to form a p-n junction for each photodiode 308. For example, the substrate 306 may be doped with an n-type dopant to form a first portion (e.g., an n-type portion) of a photodiode 308 and a p-type dopant to form a second portion (e.g., a p-type portion) of the photodiode 308. In some implementations, another technique is used to form the photodiodes 308 such as diffusion.

As further shown in FIG. 5B, a sensing region 338 may be included in the substrate 306 in the BLC region 206 adjacent to the pixel sensors 204 of the pixel sensor array 202. In some implementations, the sensing region 338 includes an undoped portion of the substrate 306 in the BLC region 206. In some implementations, the ion implantation tool 114 may dope the portions of the substrate 306 using an ion implantation technique to form the sensing region 338.

As shown in FIG. 5C, recesses 502 may be formed in the substrate 306 around the photodiodes 308 in the pixel sensor array 202. The recesses 502 may be formed as part of forming a DTI structure 310 in the substrate 306 around the photodiodes 308 of the pixel sensors 204 in the pixel sensor array 202. In some implementations, one or more semiconductor processing tools may be used to form the recesses 502 for the DTI structure 310 in the substrate 306. For example, the deposition tool 102 may form a photoresist layer on the substrate 306, the exposure tool 104 may expose the photoresist layer to a radiation source to pattern the photoresist layer, the developer tool 106 may develop and remove portions of the photoresist layer to expose the pattern, and the etch tool 108 may etch portions of substrate 306 to form the recesses 502 for the DTI structure 310 in the substrate 306. In some implementations, a photoresist removal tool removes the remaining portions of the photoresist layer (e.g., using a chemical stripper and/or another technique) after the etch tool 108 etches the substrate 306.

As shown in FIG. 5D, an ARC 312 may be formed above and/or on the substrate 306, may be formed in the recesses 502. The ARC 312 may be conformally deposited such that the ARC 312 includes a thin film that conforms to the shape and/or profile of the recesses 502. The ARC 312 may be included on the surface of the substrate 306 in the pixel sensor array 202, in the BLC region 206, and/or in the bonding pad region 208, among other examples. The deposition tool 102 may deposit the ARC 312 using a CVD technique, a PVD technique, an ALD technique, or another type of deposition technique. In some implementations, the deposition tool 102 may form the ARC 312 to a thickness that is included in a range of approximately 200 angstroms to approximately 1000 angstroms. However, other values for the range are within the scope of the present disclosure.

As shown in FIG. 5E, the recesses 502 may be filled with an oxide layer 314. Additional oxide material may be deposited such that an adhesion layer 316 extends along the surface of the substrate 306 in the pixel sensor array 202, in the BLC region 206, and in the bonding pad region 208, among other examples. The deposition tool 102 may deposit the oxide layer 314 using various CVD techniques and/or ALD techniques, such as PECVD, HDP-CVD, SACVD, and/or PEALD, among other examples.

As shown in FIG. 5F, a metal layer 318 may be formed over and/or on the adhesion layer 316. The metal layer 318 may be formed in the pixel sensor array 202, in the BLC region 206, and in the bonding pad region 208, among other examples. The portion of the metal layer 318 in the BLC region 206 may correspond to a light-blocking layer for the sensing region 338. In some implementations, the metal layer 318 may be formed to a thickness in a range of approximately 0.22 microns to approximately 0.24 microns. However, other values for the range are within the scope of the present disclosure. The deposition tool 102 and/or the plating tool 112 may deposit the metal layer 318 in a CVD operation, a PVD operation, an ALD operation, an electroplating operation, another deposition operation described above in connection with FIG. 1, and/or another suitable deposition operation. In some implementations, a seed layer is first deposited, and the metal layer 318 is deposited on the seed layer. In some implementations, the planarization tool 110 planarizes the metal layer 318 after the deposition tool 102 and/or the plating tool 112 deposits the metal layer 318.

As shown in FIG. 5G, openings 506 may be formed through the metal layer 318 in the pixel sensor array 202. The openings 506 may be formed over the photodiodes 308 of the pixel sensors 204 in the pixel sensor array 202. The openings 506 may be formed by removing first portions of the metal layer 318 to form a metal grid 320 above the DTI structure 310. The opening 506 and the metal grid 320 may be formed while the BLC region 206 and the bonding pad region 208 are masked (e.g., by a photoresist layer or a hard mask). This enables the metal layer 318 in the pixel sensor array 202 to be processed separately from the metal layer 318 in the BLC region 206 and the bonding pad region 208. In this way, the openings 506 and the metal grid 320 may be formed prior to formation of an anti-reflection array 340 in the BLC region 206. Alternatively, the pixel sensor array 202 may be masked, and an anti-reflection array 340 may be formed in the BLC region 206 prior to formation of the metal grid 320.

In some implementations, one or more semiconductor processing tools may be used to form the openings 506 in the metal layer 318 to form the metal grid 320. For example, the deposition tool 102 may form a photoresist layer on the metal layer 318 in the pixel sensor array 202, the exposure tool 104 may expose the photoresist layer to a radiation source to pattern the photoresist layer, the developer tool 106 may develop and remove portions of the photoresist layer to expose the pattern, and the etch tool 108 may etch through portions of the metal layer 318 to form the openings 506. In some implementations, the etch tool 108 etches into a portion of the underlying adhesion layer 316 to ensure that the metal layer 318 is fully etched through. The portions of the underlying adhesion layer 316 that are removed may be referred to as over-etch regions. In some implementations, a photoresist removal tool removes the remaining portions of the photoresist layer (e.g., using a chemical stripper and/or another technique) after the etch tool 108 etches the metal layer 318.

As shown in FIG. 5H, an oxide layer 324 may be formed over and/or on the metal grid 320 in the pixel sensor array 202. The oxide layer 324 may also be formed in the openings 506 over the exposed portions of the adhesion layer 316. Moreover, the oxide layer 324 may be formed on the metal layer 318 in the BLC region 206 and in the bonding pad region 208. The deposition tool 102 may conformally deposit the oxide layer 324 using a CVD technique, a PVD technique, an ALD technique, or another type of deposition technique.

As shown in FIG. 5I, an anti-reflection array 340 may be formed in the metal layer 318 in the BLC region 206 of the image sensor device 200. Recessed portions 344 may be formed in the metal layer 318 over the sensing region 338 of the BLC region 206 to form the anti-reflection array 340. The recessed portions 344 may be formed by removing second portions of the metal layer 318. The recessed portions 344 and the anti-reflection array 340 may be formed while the pixel sensor array 202 and the bonding pad region 208 are masked (e.g., by a photoresist layer or a hard mask). This enables the metal layer 318 in the BLC region 206 to be processed separately from the metal layer 318 in the pixel sensor array 202 and the bonding pad region 208. In this way, the recessed portions 344 and the anti-reflection array 340 may be formed after formation of the metal grid 320 in the pixel sensor array 202. Alternatively, the pixel sensor array 202 may be masked, and an anti-reflection array 340 may be formed in the BLC region 206 prior to formation of the metal grid 320.

In some implementations, one or more semiconductor processing tools may be used to form the recessed portions 344 in the metal layer 318 to form the anti-reflection array 340. For example, the deposition tool 102 may form a photoresist layer on the oxide layer 324 in the BLC region 206, the exposure tool 104 may expose the photoresist layer to a radiation source to pattern the photoresist layer, the developer tool 106 may develop and remove portions of the photoresist layer to expose the pattern, and the etch tool 108 may etch through portions of the oxide layer 324 and into portions of metal layer 318 to form the recessed portions 344. In some implementations, a photoresist removal tool removes the remaining portions of the photoresist layer (e.g., using a chemical stripper and/or another technique) after the etch tool 108 etches the metal layer 318.

As shown in FIG. 5J, respective color filter regions 322 may be formed in the openings 506 for each of the pixel sensors 204 in the pixel sensor array 202. Each color filter region 322 may be formed in between the metal grid 320 to reduce color mixing between adjacent pixel sensors 204. Alternatively, the areas between the metal grid 320 may be filled with a passivation layer, and a color filter layer including the color filter regions 322 may be formed on the passivation layer above the metal grid 320. In some implementations, the deposition tool 102 may deposit the color filter regions 322 in a PVD operation, an ALD operation, a CVD operation, an epitaxy operation, an oxidation operation, another type of deposition operation described in connection with FIG. 1, and/or another suitable deposition operation. In some implementations, the planarization tool 110 planarizes the color filter regions 322 after the deposition tool 102 deposits the color filter regions 322.

As shown in FIG. 5K, a recess 332 may be formed in the bonding pad region 208. In particular, the recess 332 may be formed through the oxide layer 324, through the metal layer 318, through the adhesion layer 316, through the ARC 312, and into the substrate 306 to the STI region 330. The STI region 330 may be exposed through the recess 332. The recess 332 may be formed by coating the oxide layer 324 with a photoresist (e.g., using the deposition tool 102), forming a pattern in the photoresist by exposing the photoresist to a radiation source (e.g., using the exposure tool 104), removing either the exposed portions or the non-exposed portions of the photoresist (e.g., using developer tool 106), and etching the recess 332 (e.g., using the etch tool 108) based on the pattern in the photoresist.

As shown in FIG. 5L, a buffer oxide layer 334 may be formed over the STI region 330 and on sidewalls in the recess 332 in the bonding pad region 208. The deposition tool 102 may conformally deposit the buffer oxide layer 334 using a CVD technique, a PVD technique, an ALD technique, or another type of deposition technique.

As shown in FIG. 5M, openings 508 may be formed in the recess 332 of the bonding pad region 208. In particular, the openings 508 may be formed through the buffer oxide layer 334, through the STI region 330, through the ILD layer 304, and to the metallization layer 328 in the IMD layer 302. The openings 508 may be formed by coating the buffer oxide layer 334 with a photoresist (e.g., using the deposition tool 102), forming a pattern in the photoresist by exposing the photoresist to a radiation source (e.g., using the exposure tool 104), removing either the exposed portions or the non-exposed portions of the photoresist (e.g., using developer tool 106), and etching the openings 508 (e.g., using the etch tool 108) based on the pattern in the photoresist.

As shown in FIG. 5N, a bonding pad 336 may be formed in the openings 508. For example, a semiconductor processing tool (e.g., the deposition tool 102 or the plating tool 112) may form a metal layer (e.g., an aluminum layer, a copper layer, a tungsten layer, a gold layer, a silver layer, a metal alloy layer, or another type of metal layer) on the buffer oxide layer 334, on the STI region 330, and in the openings 508 such that portions of the bonding pad 336 land on the metallization layer 328. In some implementations, portions of the bonding pad 336 may be removed by coating the bonding pad 336 with a photoresist (e.g., using the deposition tool 102), forming a pattern in the photoresist by exposing the photoresist to a radiation source (e.g., using the exposure tool 104), removing either the exposed portions or the non-exposed portions of the photoresist (e.g., using developer tool 106), and etching the portions of the bonding pad 336 (e.g., using the etch tool 108) based on the pattern in the photoresist.

As shown in FIG. 5O, a micro-lens layer 326 including a plurality of micro-lenses is formed over and/or on the color filter regions 322. The micro-lens layer 326 may include a respective micro-lens for each of the pixel sensors 204 included in the pixel sensor array 202.

As indicated above, FIGS. 5A-5O are provided as an example. Other examples may differ from what is described with regard to FIGS. 5A-5O.

Figure 6:
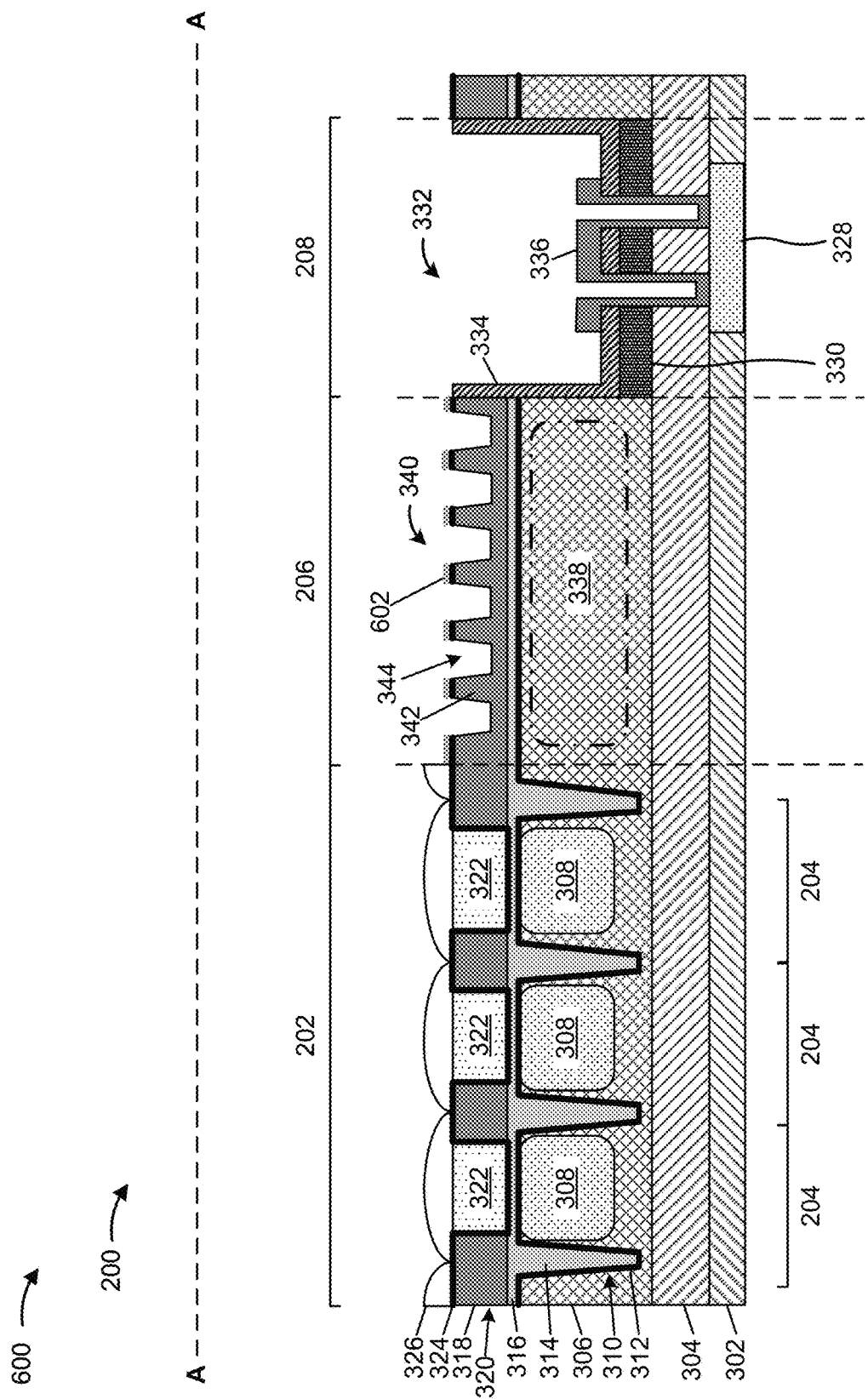
FIG. 6 is a diagram of a cross-sectional view of an example implementation of the image sensor device described herein.

FIG. 6 is a diagram of a cross-sectional view of an example implementation 600 of the image sensor device 200 described herein along the line A-A in FIG. 2. FIG. 6 illustrates a subset of cross-sectional structures and/or layers of the image sensor device 200 included in the pixel sensor array 202, the BLC region 206, and the bonding pad region 208. In the example implementation 600, the image sensor device 200 includes a similar arrangement of layers and/or structures 302-344 as the example implementation 300 of the image sensor device 200 illustrated and described in connection with FIG. 3. However, in the example implementation 600, the image sensor device 200 includes an anti-reflection film 602 over the anti-reflection array 340 in the BLC region 206 to further reduce the likelihood and/or amount of reflection of incident light toward the pixel sensor array 202.

As shown in FIG. 6, the anti-reflection film 602 may be included over the non-recessed portions 342 of the anti-reflection array 340. Here, the anti-reflection film 602 may be included on the oxide layer 324 that is included on the non-recessed portions 342. The anti-reflection film 602 may include titanium nitride (TiN), a silicon oxide ($SiO_x$ such as $SiO_2$), silicon oxynitride (SiON), and/or another suitable material that enables a reflection percentage of approximately 1% or less to be achieved for the anti-reflection array 340. In some implementations, the anti-reflection film 602 includes a single-layer structure in which a single layer of material is included over the non-recessed portions 342. In some implementations, the anti-reflection film 602 includes a multi-layer structure that includes a plurality of stacked layers, where at least two or more layers of the plurality of layers have different refractive indices to further reduce the reflection percentage of the anti-reflection array 340. In some implementations, the multi-layer structure includes alternating layers of materials with different refractive indices.

The anti-reflection film 602 may include a thickness that is selected to achieve a relatively low (e.g., less than approximately 1%) reflection percentage for the anti-reflection array 340. For example, for visible light having a wavelength included in a range of approximately 300 nanometers to approximately 700 nanometers, the thickness of the anti-reflection film 602 may be selected from a range of approximately 80 nanometers to approximately 140 nanometers in implementations in which the anti-reflection film 602 includes titanium nitride (TiN). As another example, for visible light having a wavelength included in a range of approximately 300 nanometers to approximately 700 nanometers, the thickness of the anti-reflection film 602 may be selected from a range of approximately and 70 nanometers to approximately 120 nanometers in implementations in which the anti-reflection film 602 includes silicon dioxide ($SiO_2$). However, other values for the range are within the scope of the present disclosure.

As indicated above, FIG. 6 is provided as an example. Other examples may differ from what is described with regard to FIG. 6.

Figure 7A:
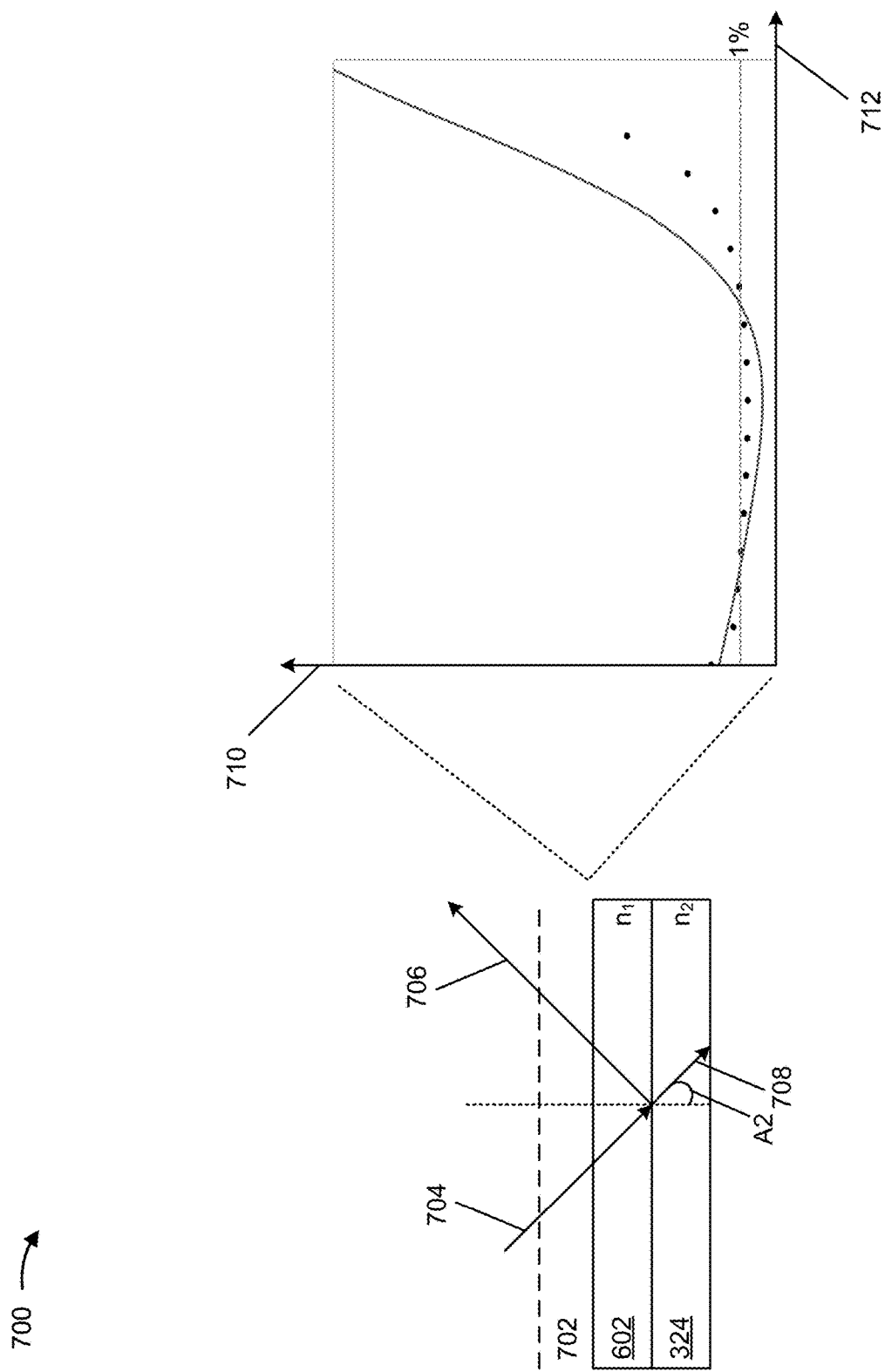
FIGS. 7A and 7B are diagrams of example implementations of anti-reflection films described herein.
Figure 7B:
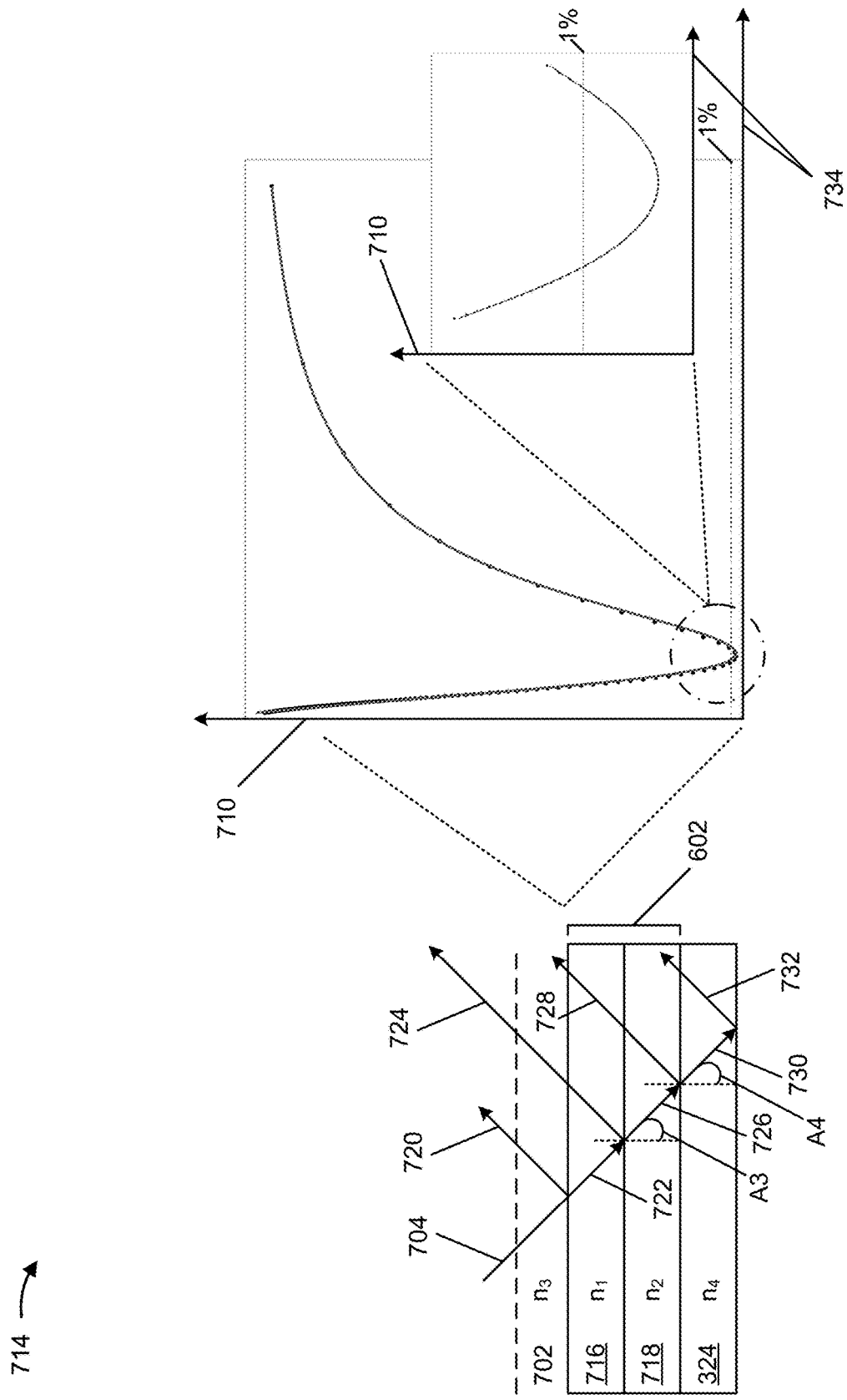

FIGS. 7A and 7B are diagrams of example implementations of anti-reflection films 602 described herein. The example implementations of anti-reflection films 602 illustrated and described in connection with FIGS. 7A and 7B may be implemented in an anti-reflection array 340 in a BLC region 206 of an image sensor device 200.

FIG. 7A illustrates an example implementation 700 in which an anti-reflection film 602 includes a single-layer structure. The anti-reflection film 602 is included on an oxide layer 324, which is included on a metal layer 318 (e.g., a light-blocking layer) in the BLC region 206. The anti-reflection film 602 interfaces with the surrounding environment 702 composed of air or another type of gas.

As shown in FIG. 7A, incident light 704 may propagate into the anti-reflection film 602 and partially reflect off of an interface between the anti-reflection film 602 and the oxide layer 324. The remaining portion of the incident light 704 refracts into the oxide layer 324. The percentage of the incident light 704 that is reflected as reflected light 706, and the percentage of the incident light 704 that is refracted as refracted light 708, may be based on an angle A2 of incidence, the refractive index ($n_1$) of the anti-reflection film 602, and refractive index ($n_2$) of the oxide layer 324

As further shown in FIG. 7A, a reflection percentage 710 for the anti-reflection array 340 may be a function of refractive index 712. In particular, a material for the anti-reflection film 602 may be selected such that the refractive index ($n_1$) of the anti-reflection film 602 facilitates a relatively low reflection percentage 710. As an example, a material for the anti-reflection film 602 may be selected such that the anti-reflection film 602 achieves a reflection percentage 710 of less than approximately 1% for the anti-reflection array 340. In some implementations, the refractive index ($n_1$) of the anti-reflection film 602 is included in a range of approximately 1.14 to approximately 1.48 to achieve a reflection percentage 710 of less than approximately 1% for the anti-reflection array 340. However, other values for the range are within the scope of the present disclosure.

FIG. 7B illustrates an example implementation 714 in which an anti-reflection film 602 includes a multi-layer structure that includes a plurality of stacked layers. The anti-reflection film 602 is included on an oxide layer 324, which is included on a metal layer 318 (e.g., a light-blocking layer) in the BLC region 206. The anti-reflection film 602 includes a first layer 716 having a first refractive index ($n_1$) and a second layer 718 having a second refractive index ($n_2$). The refractive index ($n_1$) and the refractive index ($n_2$) may be different refractive indices. The first layer 716 is included over and/or on the second layer 718 and interfaces with the surrounding environment 702 composed of air or another type of gas. The second layer 718 is included over and/or on the oxide layer 324 and interfaces with the oxide layer 324.

As shown in FIG. 7B, a portion of incident light 704 may reflect off of the first layer 716 as reflected light 720, and another portion of the incident light 704 may propagate into the first layer 716 as refracted light 722 based on the refractive index ($n_1$) of the first layer 716 and the refractive index ($n_3$) of the surrounding environment 702. A portion of the refracted light 722 reflects off of the interface between the first layer 716 and the second layer 718 as reflected light 724, and another portion of the refracted light 722 propagates into the second layer 718 as refracted light 726. The percentage of the refracted light 722 that is reflected as reflected light 724, and the percentage of the refracted light 722 that is refracted as refracted light 726, may be based on an angle A3 of incidence of the refracted light 722, the refractive index ($n_1$) of the first layer 716, and the refractive index ($n_2$) of the second layer 718.

As further shown in FIG. 7B, a portion of the refracted light 726 reflects off of the interface between the second layer 718 and the oxide layer 324 as reflected light 728, and another portion of the refracted light 726 propagates into the oxide layer 324 as refracted light 730. The percentage of the refracted light 726 that is reflected as reflected light 728, and the percentage of the refracted light 726 that is refracted as refracted light 730, may be based on an angle A4 of incidence of the refracted light 726, the refractive index ($n_2$) of the second layer 718, and the refractive index ($n_4$) of the oxide layer 324. At least a portion of the refracted light 730 may reflect off of the oxide layer 324 as reflected light 732.

The reflected light 724, 728, and 732 may continue to internally reflect and/or refract in the layers of the anti-reflection film 602. The additional reflections and refracts cause an increased percentage of the incident light 704 to be absorbed in the anti-reflection film 602, thereby reducing the reflection percentage 710 for the anti-reflection array 340.

As further shown in FIG. 7B, the reflection percentage 710 for the anti-reflection array 340 may be a function of ratio 734 of the refractive index ($n_1$) of the first layer 716 and the refractive index ($n_2$) of the second layer 718, among other parameters. In particular, the materials for the first layer 716 and the second layer 718 may be selected such that the ratio 734 of the refractive index ($n_1$) of the first layer 716 and the refractive index ($n_2$) of the second layer 718 facilitates a relatively low reflection percentage 710. As an example, the materials for the first layer 716 and the second layer 718 may be selected such that the ratio 734 of the refractive index ($n_1$) of the first layer 716 and the refractive index ($n_2$) of the second layer 718 achieves a reflection percentage 710 of less than approximately 1% for the anti-reflection array 340. In some implementations, the ratio 734 of the refractive index ($n_1$) of the first layer 716 and the refractive index ($n_2$) of the second layer 718 is included in a range of approximately 1:1 to approximately 1.3:1 to achieve a reflection percentage 710 of less than approximately 1% for the anti-reflection array 340. However, other values for the range are within the scope of the present disclosure.

As indicated above, FIGS. 7A and 7B are provided as examples. Other examples may differ from what is described with regard to FIGS. 7A and 7B.

FIGS. 8A-8D are diagrams of an example implementation 800 described herein. Example implementation 800 may be an example process for forming an image sensor device 200, described herein, that includes an anti-reflection film 602.

Figure 8A:
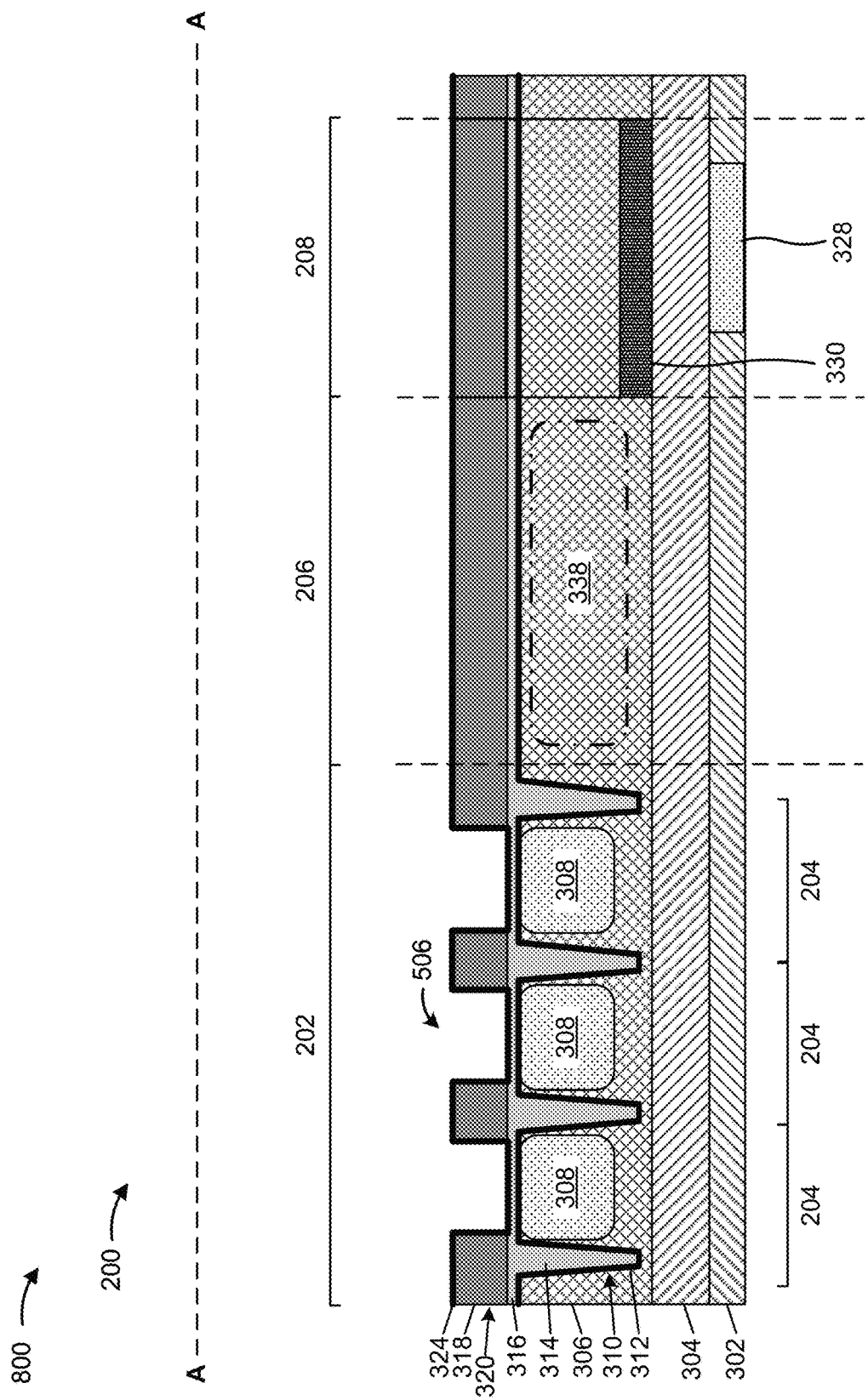
FIGS. 8A-8D are diagrams of an example implementation described herein.

As shown in FIG. 8A, one or more processing operations illustrated and described in connection with FIGS. 5A-5H may be performed to form the photodiodes 308 of the pixel sensors 204, to form the DTI structure 310, and to form the metal grid 320 in the metal layer 318, among other examples.

Figure 8B:
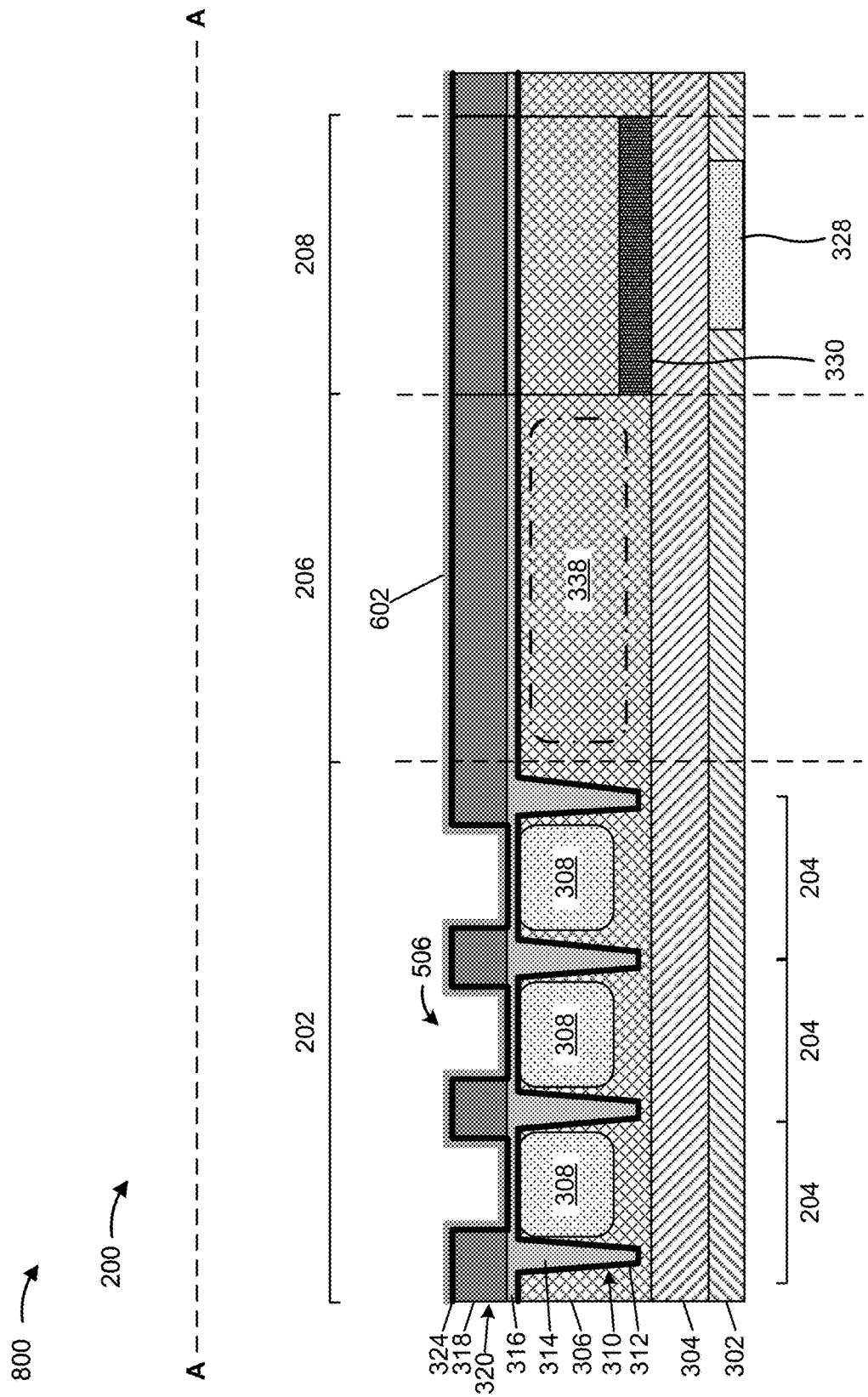

As shown in FIG. 8B, an anti-reflection film 602 may be formed over and/or on the oxide layer 324 in the pixel sensor 204, on the oxide layer 324 in the BLC region 206, and/or on the oxide layer 324 in the bonding pad region 208, among other examples. The deposition tool 102 may conformally deposit the anti-reflection film 602 using a CVD technique, a PVD technique, an ALD technique, or another type of deposition technique. In some implementations, the anti-reflection film 602 includes silicon oxynitride (SiON). In these implementations, the deposition tool 102 may form the anti-reflection film 602 by providing a flow of nitrogen (N) into a processing chamber of the deposition tool 102 in which the image sensor device 200 is located, and by providing a flow of oxygen (O) into the processing chamber, where a ratio of oxygen to nitrogen is precisely controlled to achieve a particular refractive index for the anti-reflection film 602. In this way, the refractive index for the anti-reflection film 602 may be selected to achieve a relatively low reflection percentage for the anti-reflection film 602, such as less than approximately 1%, among other examples.

Figure 8C:
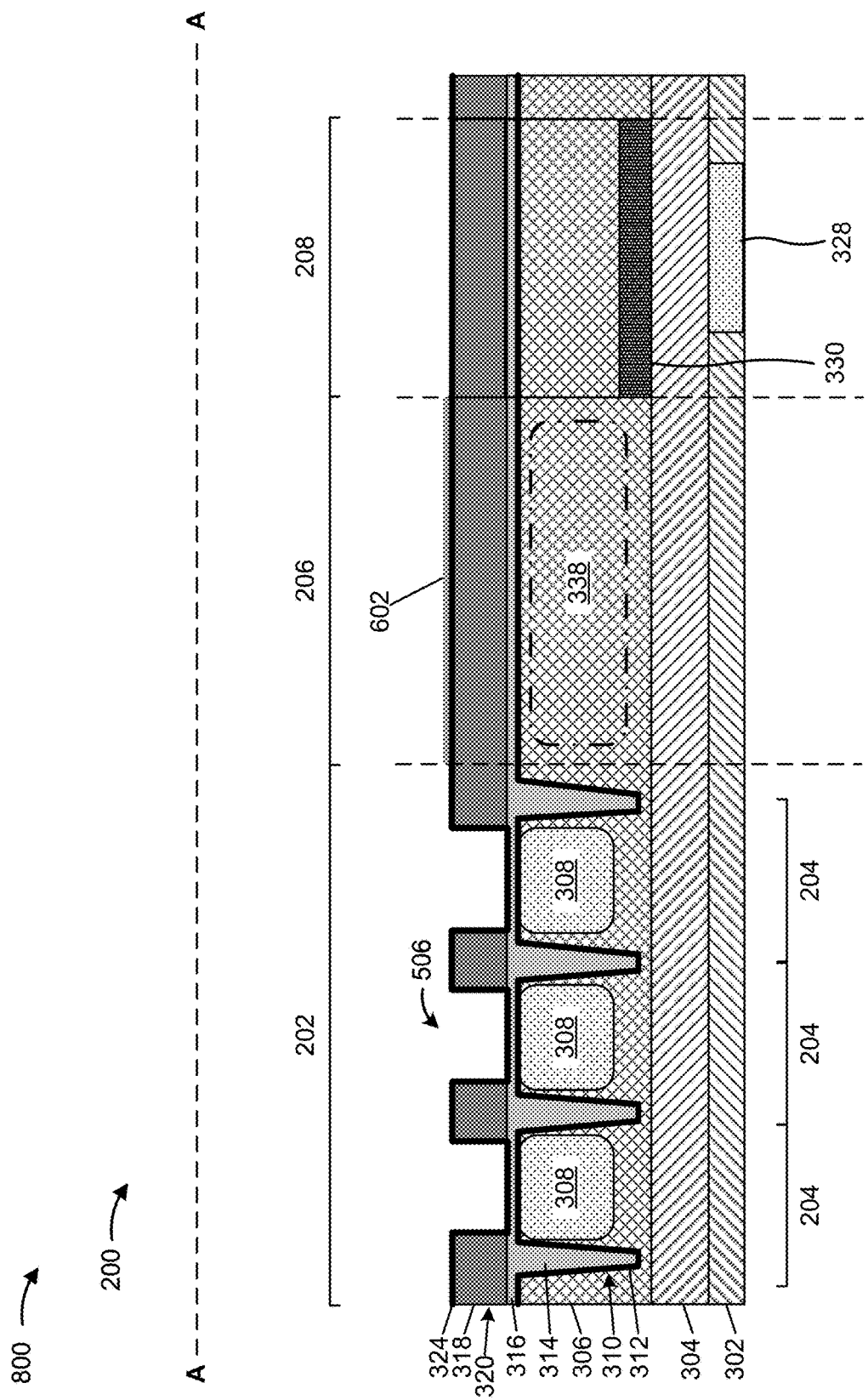

As shown in FIG. 8C, portions of the anti-reflection film 602 may be removed such that the anti-reflection film 602 remains only in the BLC region 206. In some implementations, the etch tool 108 may etch the anti-reflection film 602 to remove the portions of the anti-reflection film 602.

Figure 8D:
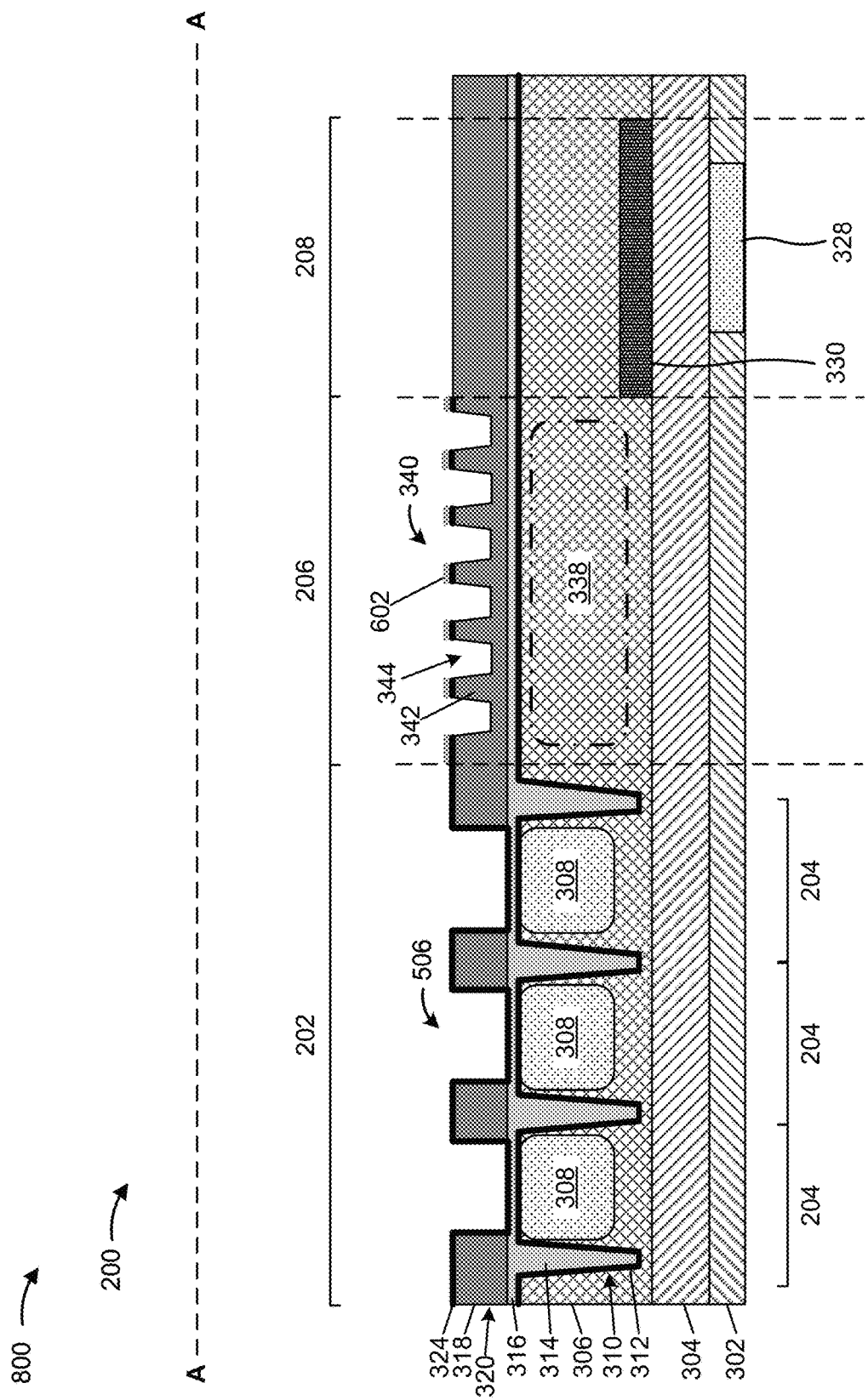

As shown in FIG. 8D, an anti-reflection array 340 may be formed in the metal layer 318 in the BLC region 206 of the image sensor device 200. Recessed portions 344 may be formed in the metal layer 318 over the sensing region 338 of the BLC region 206 to form the anti-reflection array 340. The recessed portions 344 may be formed by removing second portions of the metal layer 318. The recessed portions 344 and the anti-reflection array 340 may be formed while the pixel sensor array 202 and the bonding pad region 208 are masked (e.g., by a photoresist layer or a hard mask). This enables the metal layer 318 in the BLC region 206 to be processed separately from the metal layer 318 in the pixel sensor array 202 and the bonding pad region 208. In this way, the recessed portions 344 and the anti-reflection array 340 may be formed after formation of the metal grid 320 in the pixel sensor array 202. Alternatively, the pixel sensor array 202 may be masked, and an anti-reflection array 340 may be formed in the BLC region 206 prior to formation of the metal grid 320.

In some implementations, one or more semiconductor processing tools may be used to form the recessed portions 344 in the metal layer 318 to form the anti-reflection array 340. For example, the deposition tool 102 may form a photoresist layer on the anti-reflection film 602 in the BLC region 206, the exposure tool 104 may expose the photoresist layer to a radiation source to pattern the photoresist layer, the developer tool 106 may develop and remove portions of the photoresist layer to expose the pattern, and the etch tool 108 may etch through portions of the anti-reflection film 602, through portions of the oxide layer 324, and into portions of metal layer 318 to form the recessed portions 344. In this way, the recessed portions 344 extend through the anti-reflection film 602, through the oxide layer 324, and into the metal layer 318. In some implementations, a photoresist removal tool removes the remaining portions of the photoresist layer (e.g., using a chemical stripper and/or another technique) after the etch tool 108 etches the metal layer 318.

In some implementations, additional processing operations, such as those illustrated and described in connection with FIGS. 5J-5O may be performed subsequent to the operations described in connections with FIGS. 8A-8D.

As indicated above, FIGS. 8A-8D are provided as an example. Other examples may differ from what is described with regard to FIGS. 8A-8D.

Figure 9:
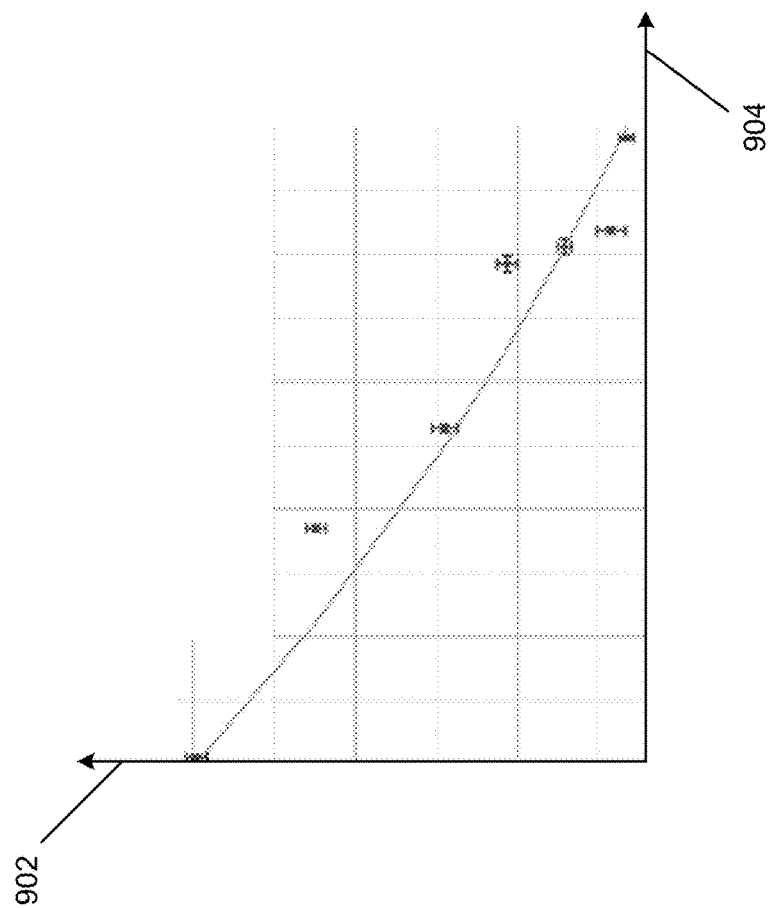
FIG. 9 is a diagram of an example implementation of gas ratios for forming an anti-reflection film described herein.

FIG. 9 is a diagram of an example implementation 900 of gas ratios for forming an anti-reflection film 602 described herein. The anti-reflection film 602 is included on an oxide layer 324, which is included on a metal layer 318 (e.g., a light-blocking layer) in the BLC region 206.

As shown in FIG. 9, a refractive index 902 for the anti-reflection film 602 may be based on a gas ratio 904 of oxygen to a combination of oxygen and nitrogen that is used when forming the anti-reflection film 602. In particular, the refractive index 902 may decrease as the gas ratio 904 decreases. In some implementations, a gas ratio 904 of approximately 0.9:1 may be used to achieve a refractive index for the anti-reflection film 602 in a range of approximately 1.06 to approximately 1.50. However, other values for the range are within the scope of the present disclosure. In some implementations, a ratio of oxygen to nitrogen approximately 9:1 may be used to achieve a refractive index for the anti-reflection film 602 in a range of approximately 1.06 to approximately 1.50. The refractive index may be selected from this range for the anti-reflection film 602 to achieve a relatively low reflection percentage (e.g., less than approximately 1%) for the anti-reflection film 602. However, other values for the range are within the scope of the present disclosure.

As indicated above, FIG. 9 is provided as an example. Other examples may differ from what is described with regard to FIG. 9.

Figure 10A:
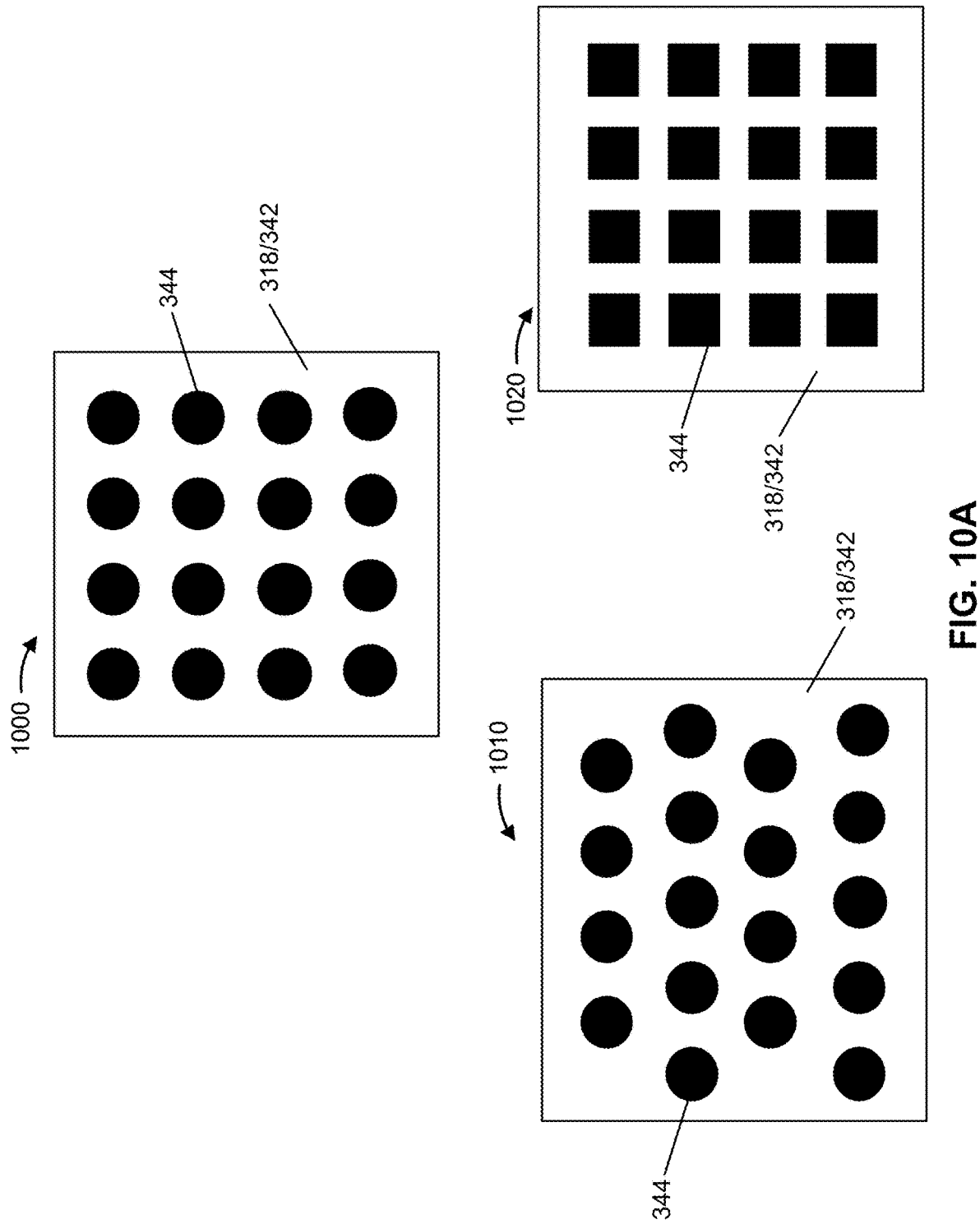
FIGS. 10A and 10B are diagrams of example implementations of anti-reflection arrays described herein.
Figure 10B:
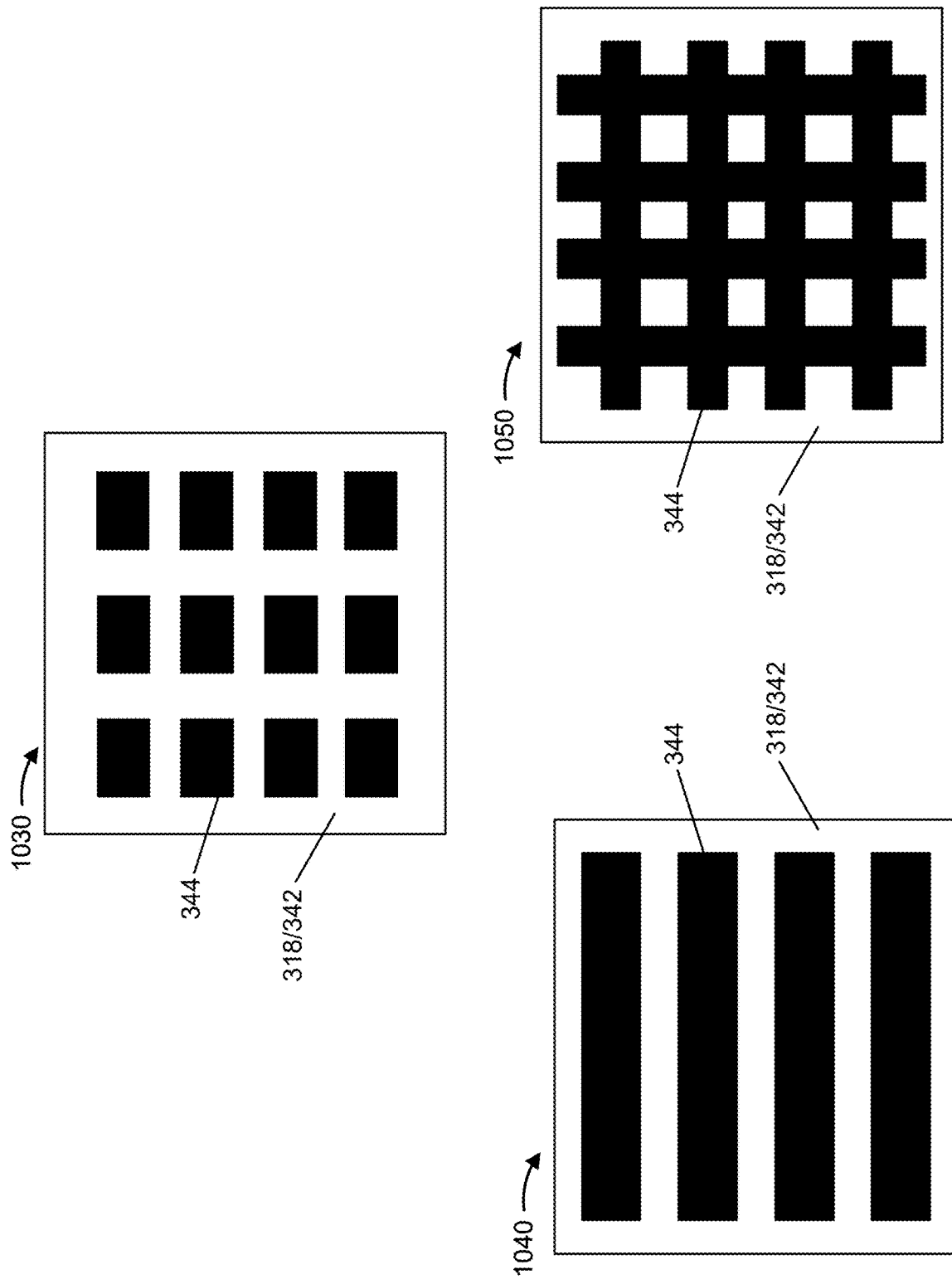

FIGS. 10A and 10B are diagrams of example implementations of anti-reflection arrays 340 described herein. The example implementations of anti-reflection arrays 340 illustrated and described in connection with FIGS. 10A and 10B may be implemented in a BLC region 206 of an image sensor device 200 described herein. The example implementations of anti-reflection arrays 340 are illustrated in a top-down view of a metal layer 318 in which the anti-reflection arrays 340 are formed.

As shown in FIG. 10A, an example implementation 1000 of an anti-reflection array 340 may include a plurality of recessed portions 344 arranged in a grid pattern in the anti-reflection array 340. The recessed portions 344 may include approximately circle-shaped recesses in a top-down view of the anti-reflection array 340.

As shown in FIG. 10A, an example implementation 1010 of an anti-reflection array 340 may include a plurality of recessed portions 344 arranged in an offset pattern in the anti-reflection array 340. In other words, the recessed portions 344 may be arranged in rows, and adjacent rows of recessed portions 344 may be offset or staggered from one another in the anti-reflection array 340. The recessed portions 344 may include approximately circle-shaped recesses in a top-down view of the anti-reflection array 340.

As further shown in FIG. 10A, an example implementation 1020 of an anti-reflection array 340 may include a plurality of recessed portions 344 arranged in a grid pattern in the anti-reflection array 340. The recessed portions 344 may include approximately square-shaped recesses in a top-down view of the anti-reflection array 340.

As shown in FIG. 10B, an example implementation 1030 of an anti-reflection array 340 may include a plurality of recessed portions 344 arranged in a grid pattern in the anti-reflection array 340. The recessed portions 344 may include approximately rectangle-shaped recesses in a top-down view of the anti-reflection array 340.

As further shown in FIG. 10B, an example implementation 1040 of an anti-reflection array 340 may include a plurality of recessed portions 344 arranged in a row in the anti-reflection array 340. The recessed portions 344 may include elongated rectangle-shaped recesses in a top-down view of the anti-reflection array 340.

As further shown in FIG. 10B, an example implementation 1050 of an anti-reflection array 340 may include a plurality of recessed portions 344 arranged in intersecting rows in the anti-reflection array 340. The recessed portions 344 may include elongated rectangle-shaped recesses in a top-down view of the anti-reflection array 340. Each recessed portion 344 may intersect with at least one other recessed portion 344 in the anti-reflection array 340.

In some implementations, the particular arrangement and/or shape of recessed portions 344 in an anti-reflection array 340 may be selected based on one or more parameters of an image sensor device 200 in which the anti-reflection array 340 is included. For example, the particular arrangement and/or shape of recessed portions 344 in an anti-reflection array 340 may be selected based on an estimated direction of incidence of incident light in which the image sensor device 200 is to receive in an intended use case of the image sensor device 200. As an example, square-shaped recesses and/or rectangular-shaped recesses may be selected for recessed portions 344 in an anti-reflection array 340 if an image sensor device 200 in which the anti-reflection array 340 is included is estimated to receive incident light from one or more discrete directions. As another example, circle-shaped recesses may be selected for recessed portions 344 in an anti-reflection array 340 if an image sensor device 200 in which the anti-reflection array 340 is included is estimated to receive omnidirectional incident light.

As another example, the particular arrangement and/or shape of recessed portions 344 in an anti-reflection array 340 may be selected based on an estimated wavelength (or wavelength composition) of incident light in which the image sensor device 200 is to receive in an intended use case of the image sensor device 200. As an example, larger recesses may be selected for recessed portions 344 in an anti-reflection array 340 if an image sensor device 200 in which the anti-reflection array 340 is included is estimated to receive incident light of a longer wavelength (e.g., red light, infrared light). As another example, smaller recesses may be selected for recessed portions 344 in an anti-reflection array 340 if an image sensor device 200 in which the anti-reflection array 340 is included is estimated to receive incident light of a shorter wavelength (e.g., blue light, ultraviolet light).

As indicated above, FIGS. 10A and 10B are provided as examples. Other examples may differ from what is described with regard to FIGS. 10A and 10B.

Figure 11:
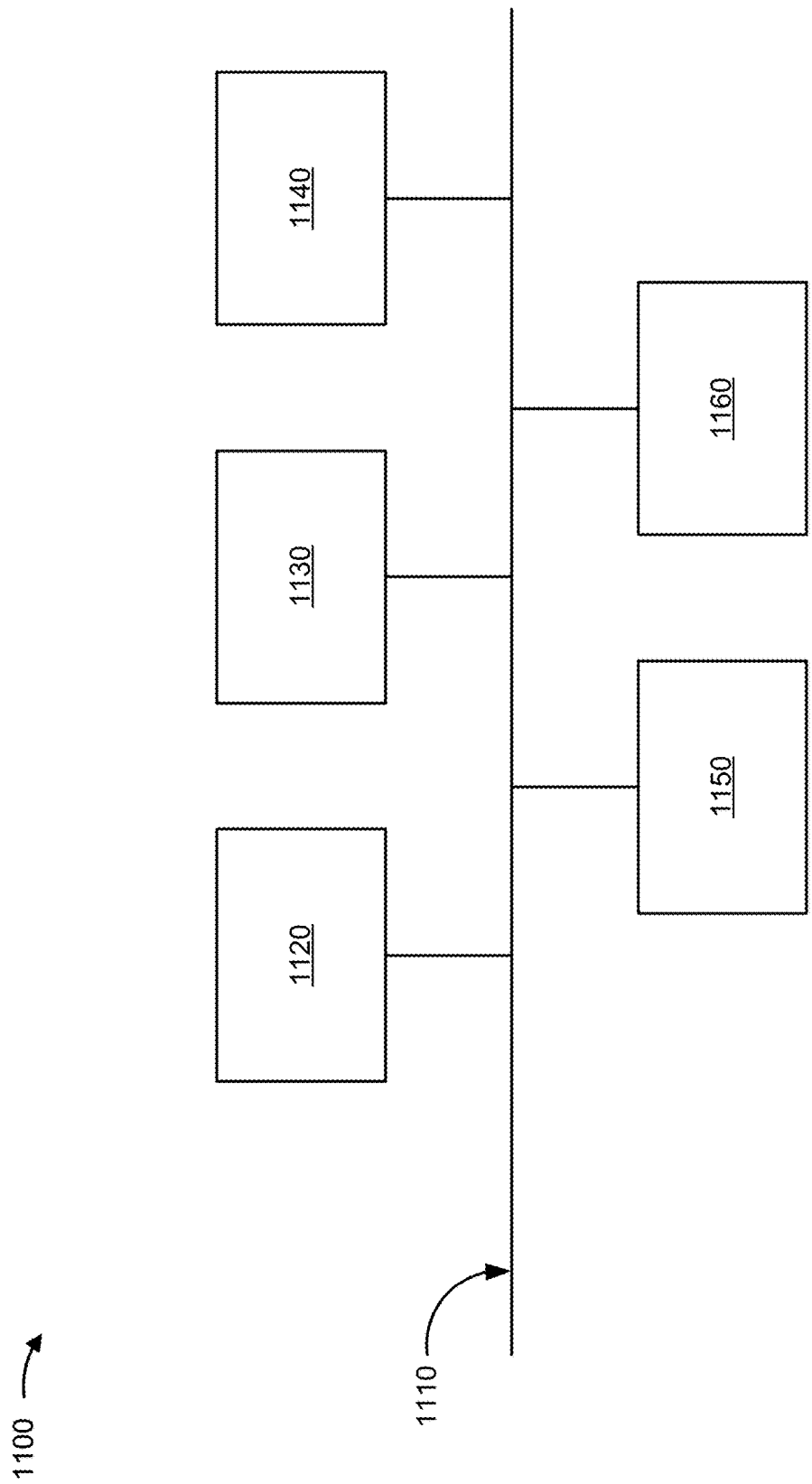
FIG. 11 is a diagram of example components of a device described herein.

FIG. 11 is a diagram of example components of a device 1100 described herein. In some implementations, one or more of the semiconductor processing tools 102-114 and/or the wafer/die transport tool 116 may include one or more devices 1100 and/or one or more components of the device 1100. As shown in FIG. 11, the device 1100 may include a bus 1110, a processor 1120, a memory 1130, an input component 1140, an output component 1150, and/or a communication component 1160.

The bus 1110 may include one or more components that enable wired and/or wireless communication among the components of the device 1100. The bus 1110 may couple together two or more components of FIG. 11, such as via operative coupling, communicative coupling, electronic coupling, and/or electric coupling. For example, the bus 1110 may include an electrical connection (e.g., a wire, a trace, and/or a lead) and/or a wireless bus. The processor 1120 may include a central processing unit, a graphics processing unit, a microprocessor, a controller, a microcontroller, a digital signal processor, a field-programmable gate array, an application-specific integrated circuit, and/or another type of processing component. The processor 1120 may be implemented in hardware, firmware, or a combination of hardware and software. In some implementations, the processor 1120 may include one or more processors capable of being programmed to perform one or more operations or processes described elsewhere herein.

The memory 1130 may include volatile and/or nonvolatile memory. For example, the memory 1130 may include random access memory (RAM), read only memory (ROM), a hard disk drive, and/or another type of memory (e.g., a flash memory, a magnetic memory, and/or an optical memory). The memory 1130 may include internal memory (e.g., RAM, ROM, or a hard disk drive) and/or removable memory (e.g., removable via a universal serial bus connection). The memory 1130 may be a non-transitory computer-readable medium. The memory 1130 may store information, one or more instructions, and/or software (e.g., one or more software applications) related to the operation of the device 1100. In some implementations, the memory 1130 may include one or more memories that are coupled (e.g., communicatively coupled) to one or more processors (e.g., processor 1120), such as via the bus 1110. Communicative coupling between a processor 1120 and a memory 1130 may enable the processor 1120 to read and/or process information stored in the memory 1130 and/or to store information in the memory 1130.

The input component 1140 may enable the device 1100 to receive input, such as user input and/or sensed input. For example, the input component 1140 may include a touch screen, a keyboard, a keypad, a mouse, a button, a microphone, a switch, a sensor, a global positioning system sensor, an accelerometer, a gyroscope, and/or an actuator. The output component 1150 may enable the device 1100 to provide output, such as via a display, a speaker, and/or a light-emitting diode. The communication component 1160 may enable the device 1100 to communicate with other devices via a wired connection and/or a wireless connection. For example, the communication component 1160 may include a receiver, a transmitter, a transceiver, a modem, a network interface card, and/or an antenna.

The device 1100 may perform one or more operations or processes described herein. For example, a non-transitory computer-readable medium (e.g., memory 1130) may store a set of instructions (e.g., one or more instructions or code) for execution by the processor 1120. The processor 1120 may execute the set of instructions to perform one or more operations or processes described herein. In some implementations, execution of the set of instructions, by one or more processors 1120, causes the one or more processors 1120 and/or the device 1100 to perform one or more operations or processes described herein. In some implementations, hardwired circuitry may be used instead of or in combination with the instructions to perform one or more operations or processes described herein. Additionally, or alternatively, the processor 1120 may be configured to perform one or more operations or processes described herein. Thus, implementations described herein are not limited to any specific combination of hardware circuitry and software.

The number and arrangement of components shown in FIG. 11 are provided as an example. The device 1100 may include additional components, fewer components, different components, or differently arranged components than those shown in FIG. 11. Additionally, or alternatively, a set of components (e.g., one or more components) of the device 1100 may perform one or more functions described as being performed by another set of components of the device 1100.

Figure 12:
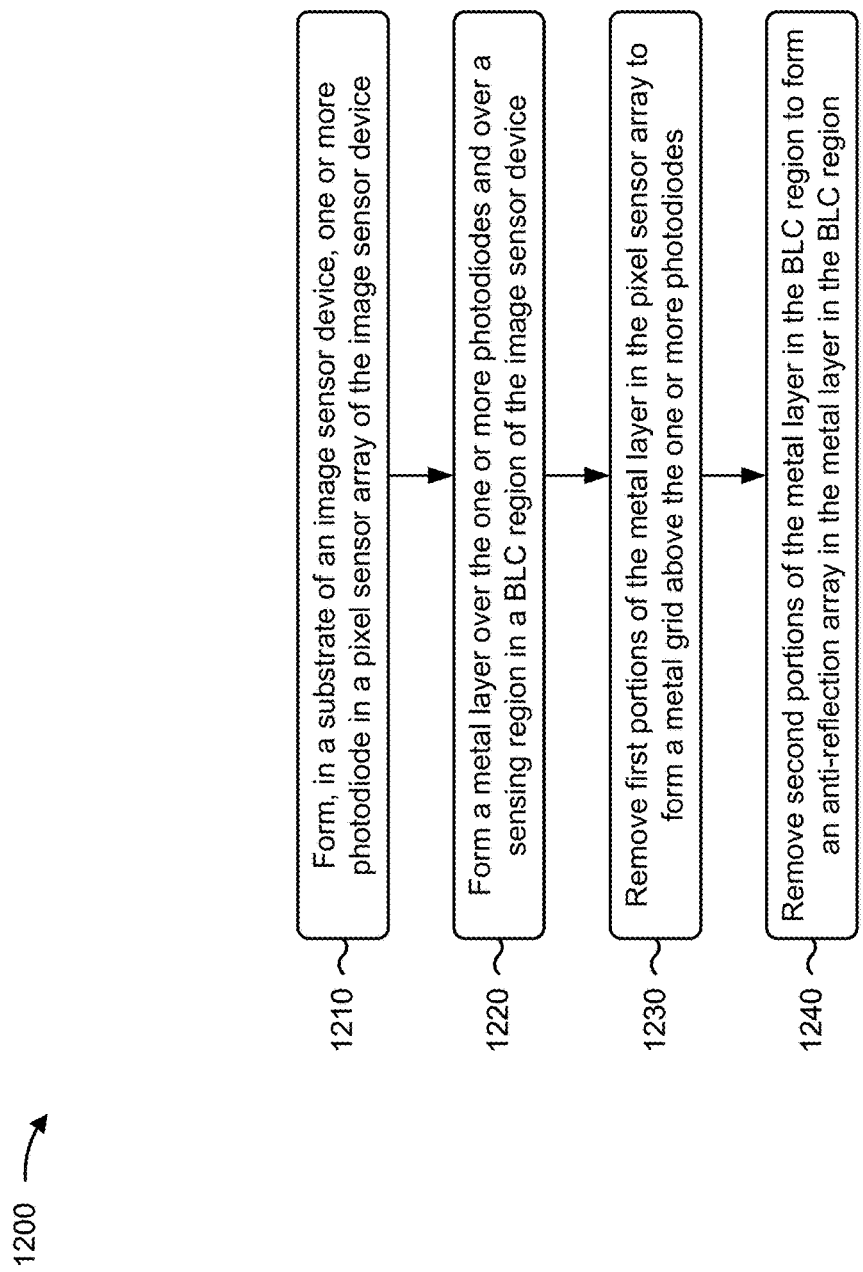
FIG. 12 is a flowchart of an example process associated with forming an image sensor device.

FIG. 12 is a flowchart of an example process 1200 associated with forming an image sensor device. In some implementations, one or more process blocks of FIG. 12 are performed by one or more semiconductor processing tools (e.g., one or more of the semiconductor processing tools 102-114). Additionally, or alternatively, one or more process blocks of FIG. 12 may be performed by one or more components of device 1100, such as processor 1120, memory 1130, input component 1140, output component 1150, and/or communication component 1160.

As shown in FIG. 12, process 1200 may include forming, in a substrate of an image sensor device, one or more photodiodes in a pixel sensor array of the image sensor device (block 1210). For example, one or more of the semiconductor processing tools 102-114 may form, in a substrate 306 of an image sensor device 200, one or more photodiodes 308 in a pixel sensor array 202 of the image sensor device 200, as described herein.

As further shown in FIG. 12, process 1200 may include forming a metal layer over the one or more photodiodes and over a sensing region in a BLC region of the image sensor device (block 1220). For example, one or more of the semiconductor processing tools 102-114 may form a metal layer 318 over the one or more photodiodes 308 and over a sensing region 338 in a BLC region 206 of the image sensor device 200, as described herein.

As further shown in FIG. 12, process 1200 may include removing first portions of the metal layer in the pixel sensor array to form a metal grid above the one or more photodiodes (block 1230). For example, one or more of the semiconductor processing tools 102-114 may remove first portions of the metal layer 318 in the pixel sensor array 202 to form a metal grid 320 above the one or more photodiodes 308, as described herein.

As further shown in FIG. 12, process 1200 may include removing second portions of the metal layer in the BLC region to form an anti-reflection array in the metal layer in the BLC region (block 1240). For example, one or more of the semiconductor processing tools 102-114 may remove second portions of the metal layer 318 in the BLC region 206 to form an anti-reflection array 340 in the metal layer 318 in the BLC region 206, as described herein. In some implementations, the metal layer 318 in the BLC region 206 corresponds to a light-blocking layer over the sensing region 338 in the BLC region 206.

Process 1200 may include additional implementations, such as any single implementation or any combination of implementations described below and/or in connection with one or more other processes described elsewhere herein.

In a first implementation, removing the second portions of the metal layer 318 in the BLC region 206 includes removing the second portions of the metal layer 318 in the BLC region 206 after removing the first portions of the metal layer 318 in the pixel sensor array 202. In a second implementation, alone or in combination with the first implementation, removing the first portions of the metal layer 318 in the pixel sensor array 202 includes removing the first portions of the metal layer 318 in the pixel sensor array 202 while the metal layer 318 in the BLC region 206 is masked.

In a third implementation, alone or in combination with one or more of the first and second implementations, process 1200 includes forming an oxide layer 324 on the metal layer 318 after removing the first portions of the metal layer 318 in the pixel sensor array 202 and prior to removing the second portions of the metal layer 318 in the BLC region 206.

In a fourth implementation, alone or in combination with one or more of the first through third implementations, process 1200 includes removing portions of the oxide layer 324 in the BLC region 206 to form the anti-reflection array 340. In a fifth implementation, alone or in combination with one or more of the first through fourth implementations, process 1200 includes forming an anti-reflection film 602 on the metal layer 318 after removing the first portions of the metal layer 318 in the pixel sensor array 202 and prior to removing the second portions of the metal layer 318 in the BLC region 206.

In a sixth implementation, alone or in combination with one or more of the first through fifth implementations, the anti-reflection film 602 includes silicon oxynitride (SiON), and forming the anti-reflection film 602 includes providing a flow of nitrogen (N) into a processing chamber in which the image sensor device 200 is located, and providing a flow of oxygen (O) into the processing chamber, where a ratio of the flow of oxygen to the flow of nitrogen is included in a range of approximately 0.9:1 to approximately 9:1.

Although FIG. 12 shows example blocks of process 1200, in some implementations, process 1200 includes additional blocks, fewer blocks, different blocks, or differently arranged blocks than those depicted in FIG. 12. Additionally, or alternatively, two or more of the blocks of process 1200 may be performed in parallel.

In this way, an image sensor device includes a pixel sensor array and a BLC region adjacent to the pixel sensor array. The BLC region may include a sensing region in a substrate and a light-blocking layer above the sensing region. An anti-reflection array may be formed in the light-blocking layer. The anti-reflection array includes holes, trenches, and/or other structural features such that the light-blocking layer includes two or more areas in which the top surface of the light-blocking layer is at different heights in the image sensor device. The different heights of the top surface of the light-blocking layer reduce the likelihood of light being reflected off of the light-blocking layer and toward the pixel sensor array. In this way, the anti-reflection array may reduce the likelihood of occurrence of flares or hot spots in images generated by the image sensor device, which may increase the image quality of the images generated by the image sensor device.

As described in greater detail above, some implementations described herein provide an image sensor device. The image sensor device includes a pixel sensor array. The image sensor device includes a BLC region adjacent to the pixel sensor array. The BLC region includes a sensing region, a light-blocking layer over the sensing region, and an anti-reflection array in the light-blocking layer. The anti-reflection array includes a plurality of recessed portions in the light-blocking layer.

As described in greater detail above, some implementations described herein provide an image sensor device. The image sensor device includes a pixel sensor array. The image sensor device includes a BLC region adjacent to the pixel sensor array. The BLC region includes a sensing region, a light-blocking layer, over the sensing region, an anti-reflection film over the light-blocking layer, and an anti-reflection array in the anti-reflection film and in the light-blocking layer. The anti-reflection array includes a plurality of recessed portions that extend through the anti-reflection film and into the light-blocking layer.

As described in greater detail above, some implementations described herein provide a method. The method includes forming, in a substrate of an image sensor device, one or more photodiodes in a pixel sensor array of the image sensor device. The method includes forming a metal layer over the one or more photodiodes and over a sensing region in a BLC region of the image sensor device. The method includes removing first portions of the metal layer in the pixel sensor array to form a metal grid above the one or more photodiodes. The method includes removing second portions of the metal layer in the BLC region to form an anti-reflection array in the metal layer in the BLC region, where the metal layer in the BLC region corresponds to a light-blocking layer over the sensing region in the BLC region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image sensor device, comprising:
   a pixel sensor array; and
   a black level correction (BLC) region, adjacent to the pixel sensor array, comprising:
      a sensing region;
      a light-blocking layer over the sensing region; and
      an anti-reflection array, in the light-blocking layer, comprising a plurality of recessed portions in the light-blocking layer,
         wherein a ratio of a depth of one or more recessed portions, of the plurality of recessed portions, to a thickness of the light-block layer is in a range from 0.5:1 to 0.9:1.

2. The image sensor device of claim 1, wherein a top surface of the light-blocking layer in a non-recessed portion of the light-blocking layer is at a first height in the image sensor device that is greater relative to a second height of the top surface of the light-blocking layer in a recessed portion of the plurality of recessed portions.

3. The image sensor device of claim 1, wherein the plurality of recessed portions are arranged in a grid pattern in the anti-reflection array.

4. The image sensor device of claim 1, wherein the plurality of recessed portions are arranged in an offset pattern in the anti-reflection array.

5. The image sensor device of claim 1, wherein the plurality of recessed portions are arranged in a row in the anti-reflection array.

6. The image sensor device of claim 1, wherein the anti-reflection array is configured to impede incident light from being reflected off of the BLC region toward the pixel sensor array.

7. An image sensor device, comprising:
   a pixel sensor array; and
   a black level correction (BLC) region, adjacent to the pixel sensor array, comprising:
      a sensing region;
      a light-blocking layer over the sensing region;
      an anti-reflection film over the light-blocking layer; and
      an anti-reflection array, in the anti-reflection film and in the light-blocking layer, comprising a plurality of recessed portions that extend through the anti-reflection film and into the light-blocking layer.

8. The image sensor device of claim 7, wherein the anti-reflection film comprises a single-layer structure.

9. The image sensor device of claim 7, wherein the anti-reflection film comprises a plurality of stacked layers.

10. The image sensor device of claim 9, wherein the plurality of stacked layers comprise:
    a first layer having a first refractive index; and
    a second layer having a second refractive index,
       wherein the first refractive index and the second refractive index are different refractive indices.

11. The image sensor device of claim 10, wherein a ratio of the second refractive index to the first refractive index is included in a range of approximately 1:1 to approximately 1.3:1.

12. The image sensor device of claim 7, wherein the anti-reflection film comprises at least one of:
    titanium nitride (TiN),
    silicon oxide ($SiO_x$), or
    silicon oxynitride (SiON).

13. The image sensor device of claim 7, wherein a refractive index of the anti-reflection film is included in a range of approximately 1.14 to approximately 1.48.

14. A method, comprising:
    forming, in a substrate of an image sensor device, one or more photodiodes in a pixel sensor array of the image sensor device;
    forming a metal layer over the one or more photodiodes and over a sensing region in a black level correction (BLC) region of the image sensor device;
    removing first portions of the metal layer in the pixel sensor array to form a metal grid above the one or more photodiodes; and
    removing second portions of the metal layer in the BLC region to form an anti-reflection array in the metal layer in the BLC region,
       wherein the metal layer in the BLC region corresponds to a light-blocking layer over the sensing region in the BLC region.

15. The method of claim 14, wherein removing the second portions of the metal layer in the BLC region comprises:
    removing the second portions of the metal layer in the BLC region after removing the first portions of the metal layer in the pixel sensor array.

16. The method of claim 14, wherein removing the first portions of the metal layer in the pixel sensor array comprises:
    removing the first portions of the metal layer in the pixel sensor array while the metal layer in the BLC region is masked.

17. The method of claim 14, further comprising:
    forming an oxide layer on the metal layer after removing the first portions of the metal layer in the pixel sensor array and prior to removing the second portions of the metal layer in the BLC region.

18. The method of claim 17, further comprising:
removing portions of the oxide layer in the BLC region to form the anti-reflection array.

19. The method of claim 14, further comprising:
forming an anti-reflection film on the metal layer after removing the first portions of the metal layer in the pixel sensor array and prior to removing the second portions of the metal layer in the BLC region.

20. The method of claim 19, wherein the anti-reflection film comprises silicon oxynitride (SiON); and
   wherein forming the anti-reflection film comprises:
      providing a flow of nitrogen (N) into a processing chamber in which the image sensor device is located; and
      providing a flow of oxygen (O) into the processing chamber,
         wherein a ratio of the flow of oxygen to the flow of nitrogen is included in a range of approximately 0.9:1 to approximately 9:1.

* * * * *